(12) United States Patent
Simmons

(10) Patent No.: US 7,975,794 B2
(45) Date of Patent: Jul. 12, 2011

(54) SUSPENSION FOR TRACKED VEHICLES

(75) Inventor: Val J. Simmons, Providence, UT (US)

(73) Assignee: Simmons, Inc., Providence, UT (US)

( * ) Notice: Subject to any disclaimer, the term of this patent is extended or adjusted under 35 U.S.C. 154(b) by 9 days.

(21) Appl. No.: 12/468,852

(22) Filed: May 19, 2009

(65) Prior Publication Data

US 2009/0321167 A1    Dec. 31, 2009

Related U.S. Application Data

(63) Continuation-in-part of application No. 11/540,339, filed on Sep. 28, 2006, now Pat. No. 7,533,750.

(60) Provisional application No. 60/721,296, filed on Sep. 28, 2005.

(51) Int. Cl.
*B62M 27/02* (2006.01)

(52) U.S. Cl. .......................... 180/193; 180/9.5; 305/120

(58) Field of Classification Search .................. 180/193, 180/9.5; 305/120, 127, 128, 141
See application file for complete search history.

(56) References Cited

U.S. PATENT DOCUMENTS

| | | | |
|---|---|---|---|
| 3,111,349 A | 11/1963 | Tucker, Sr. | |
| 3,527,506 A | 9/1970 | Erickson | |
| 3,613,811 A | 10/1971 | Brandli | |
| 3,721,308 A | 3/1973 | Brandli et al. | |
| 3,773,126 A | 11/1973 | Irvine | |
| 3,784,263 A | 1/1974 | Hendrickson et al. | |
| 3,788,412 A | 1/1974 | Vincent | |
| 3,800,897 A | 4/1974 | Irvine | |
| 3,856,099 A | 12/1974 | Bowers | |
| 3,863,727 A | 2/1975 | Michrina | |
| 3,913,694 A | 10/1975 | Forsgren | |
| 3,922,024 A | 11/1975 | Burkhardt et al. | |
| 3,931,861 A | 1/1976 | Olson | |
| 3,933,213 A | 1/1976 | Trowbridge | |
| 3,945,451 A | 3/1976 | Aaen | |
| 3,966,004 A | 6/1976 | Rose | |
| 3,966,181 A | 6/1976 | Lessard | |
| 3,967,692 A | 7/1976 | Hoffman | |
| 3,974,890 A | 8/1976 | Noble | |
| 4,034,820 A | 7/1977 | Barnhardt | |
| 4,082,155 A | 4/1978 | McCartney | |
| 4,093,033 A * | 6/1978 | Rosch .......................... | 180/9.56 |
| 4,133,400 A | 1/1979 | Shiraishi | |
| 4,217,006 A | 8/1980 | Dehnert | |
| 4,222,453 A | 9/1980 | Fixsen et al. | |
| 4,284,161 A | 8/1981 | Blass | |
| 4,301,884 A | 11/1981 | Taylor | |
| 4,305,476 A | 12/1981 | Blass et al. | |
| 4,314,618 A | 2/1982 | Tamura | |
| 4,328,878 A | 5/1982 | Yoshida | |
| 4,344,637 A | 8/1982 | Williams, Jr. et al. | |
| 4,393,953 A | 7/1983 | Boulianne | |
| 4,407,386 A | 10/1983 | Yasui et al. | |
| 4,431,078 A | 2/1984 | Ebert et al. | |
| 4,462,480 A | 7/1984 | Yasui et al. | |

(Continued)

*Primary Examiner* — Anne Marie M Boehler
*Assistant Examiner* — Tashiana Adams
(74) *Attorney, Agent, or Firm* — Briggs and Morgan, P.A.

(57) ABSTRACT

A suspension system for a tracked vehicle providing a wide range of performance characteristics via a user-adjustable overload spring assembly which engages a rear suspension element. An optimum spring force can depend on the both operator characteristics and local operating conditions. A user is afforded the ability to adjust a rear suspension system to provide desired ride characteristics. A suspension system including a movable stop to define a mechanical relation between a rear suspension arm and a front suspension arm is also disclosed.

17 Claims, 26 Drawing Sheets

U.S. PATENT DOCUMENTS

| | | | |
|---|---|---|---|
| 4,518,056 A | 5/1985 | Kobayashi | |
| 4,544,170 A | 10/1985 | Ebert et al. | |
| 4,591,173 A | 5/1986 | Marier | |
| 4,633,964 A | 1/1987 | Boyer et al. | |
| 4,671,521 A | 6/1987 | Talbot et al. | |
| 4,892,164 A | 1/1990 | Yasui et al. | |
| 4,892,165 A | 1/1990 | Yasui et al. | |
| 4,917,207 A | 4/1990 | Yasui et al. | |
| 4,987,965 A | 1/1991 | Bourret | |
| 5,060,745 A | 10/1991 | Yasui et al. | |
| 5,104,205 A | 4/1992 | Motomura et al. | |
| 5,265,692 A | 11/1993 | Mallette | |
| 5,370,198 A * | 12/1994 | Karpik | 180/193 |
| 5,474,146 A | 12/1995 | Yoshioka et al. | |
| 5,564,683 A | 10/1996 | Stuck | |
| 5,586,614 A | 12/1996 | Kouchi et al. | |
| 5,613,570 A | 3/1997 | Becker | |
| 5,660,245 A | 8/1997 | Marier et al. | |
| 5,667,031 A * | 9/1997 | Karpik | 180/193 |
| 5,692,579 A | 12/1997 | Peppel et al. | |
| 5,727,643 A | 3/1998 | Kawano et al. | |
| 5,730,242 A | 3/1998 | Furusawa | |
| 5,791,429 A | 8/1998 | Bergman | |
| 5,881,834 A * | 3/1999 | Karpik | 180/193 |
| 5,904,216 A | 5/1999 | Furusawa | |
| 5,904,217 A | 5/1999 | Yamamoto et al. | |
| 5,944,134 A | 8/1999 | Peppel et al. | |
| 5,947,220 A | 9/1999 | Oka et al. | |
| 6,032,752 A | 3/2000 | Karpik et al. | |
| 6,109,382 A | 8/2000 | Kubota | |
| 6,112,840 A | 9/2000 | Forbes | |
| 6,125,958 A | 10/2000 | Olson et al. | |
| 6,161,908 A | 12/2000 | Takayama et al. | |
| 6,170,589 B1 | 1/2001 | Kawano et al. | |
| 6,206,124 B1 | 3/2001 | Mallette et al. | |
| 6,234,264 B1 | 5/2001 | Boivin et al. | |
| 6,253,867 B1 | 7/2001 | Lillbacka | |
| 6,263,991 B1 | 7/2001 | Savage et al. | |
| 6,283,241 B1 | 9/2001 | Kubota | |
| 6,321,864 B1 | 11/2001 | Forbes | |
| 6,354,391 B1 | 3/2002 | Cormican | |
| 6,354,677 B1 | 3/2002 | Cook et al. | |
| 6,357,543 B1 | 3/2002 | Karpik | |
| 6,390,219 B1 * | 5/2002 | Vaisanen | 180/193 |
| 6,401,852 B2 | 6/2002 | Lillbacka | |
| 6,450,279 B1 * | 9/2002 | Imamura | 180/193 |
| 6,450,280 B1 | 9/2002 | Pepka et al. | |
| 6,460,646 B2 | 10/2002 | Kanan | |
| 6,467,561 B1 | 10/2002 | Boivin et al. | |
| 6,474,662 B1 | 11/2002 | Cormican | |
| 6,478,098 B2 | 11/2002 | Boivin et al. | |
| 6,494,548 B2 | 12/2002 | Courtemanche | |
| 6,499,551 B2 | 12/2002 | Karpik | |
| RE38,124 E | 5/2003 | Mallette et al. | |
| 6,561,302 B2 | 5/2003 | Karpik | |
| 6,595,309 B1 | 7/2003 | Savage et al. | |
| 6,619,417 B2 * | 9/2003 | Lemieux | 180/182 |
| 6,626,258 B1 | 9/2003 | Forbes | |
| 6,761,236 B2 | 7/2004 | Hibbert | |
| 6,796,395 B1 | 9/2004 | Berg et al. | |
| 6,880,660 B1 | 4/2005 | Berg et al. | |
| 6,926,108 B1 | 8/2005 | Polakowski et al. | |
| 6,991,057 B2 | 1/2006 | Imamura et al. | |
| 7,014,004 B2 | 3/2006 | Etou | |
| 7,040,426 B1 | 5/2006 | Berg | |
| 7,040,438 B2 | 5/2006 | Yoshihara | |
| 7,070,012 B2 * | 7/2006 | Fecteau | 180/9.5 |
| 7,128,180 B2 | 10/2006 | Polakowski et al. | |
| 7,147,074 B1 | 12/2006 | Berg et al. | |
| 2001/0027887 A1 | 10/2001 | Lillbacka et al. | |
| 2001/0030467 A1 | 10/2001 | Courtemanche | |
| 2002/0033290 A1 | 3/2002 | Vaisanen | |
| 2002/0053477 A1 | 5/2002 | Karpik | |
| 2002/0060102 A1 | 5/2002 | Boivin et al. | |
| 2002/0185829 A1 | 12/2002 | Cormican | |
| 2005/0016784 A1 | 1/2005 | Fecteau | |
| 2005/0023060 A1 | 2/2005 | Blanchard | |
| 2005/0183899 A1 | 8/2005 | Polakowski et al. | |
| 2005/0199433 A1 | 9/2005 | Abe et al. | |
| 2005/0274559 A1 | 12/2005 | Lillbaka et al. | |
| 2006/0169510 A1 | 8/2006 | Visscher | |
| 2006/0180370 A1 | 8/2006 | Polakowski et al. | |
| 2006/185919 A1 | 8/2006 | Hibbert et al. | |
| 2006/0261671 A1 | 11/2006 | Lemme | |

* cited by examiner

SUSPENSION FOR TRACKED VEHICLES

RELATED APPLICATIONS

This application is a continuation-in-part of U.S. Pat. No. 7,533,750, which claimed priority from U.S. Provisional Application No. 60/721,296, filed on Sep. 28, 2005, the disclosure of each being hereby incorporated by reference in its entirety.

FIELD OF THE INVENTION

The invention relates to snowmobiles and more particularly to suspension systems for snowmobiles providing for efficient reconfiguration based on anticipated load conditions.

BACKGROUND OF THE INVENTION

Performance characteristics of snowmobiles, including ride comfort and weight balance, depend upon a variety of systems and components, including the snowmobile suspension. Modern snowmobile suspensions typically include two systems, a front suspension system for the skis and a rear suspension system for the track.

The rear suspension of a snowmobile supports an endless track driven by the snowmobile engine to propel the machine. The track is supported beneath the vehicle chassis by a suspension that is designed to provide proper weight balance and ride comfort by absorbing some of shock as the snowmobile traverses uneven terrain. Most modern snowmobiles utilize a slide rail suspension which incorporates a slide rail along with several idler wheels to support the track. The slide rail typically is suspended beneath the chassis by two or more suspension arms, each arm being attached at its upper end to the chassis of the snowmobile and attached at its lower end to the slide rail. The mechanical linkage of the slide rail to the suspension arms and to the snowmobile chassis typically is provided with springs and one or more shock absorbers, the springs being loaded to urge the slide rails downwardly away from the snowmobile chassis, and the shocks providing dampening forces for improved ride comfort.

A variety of configurations of suspension arms, springs, shocks, and shock rods have been utilized to alter the characteristics and feel of the ride given by a particular suspension system. U.S. Pat. No. 5,265,692 shows a snowmobile track suspension having a pair of generally parallel suspension arms connecting the slide rail to the snowmobile chassis. The lower end of the rear suspension arm has a pivot mount that is movable longitudinally of the slide rail. When this pivot is located at its forward most portion of longitudinal movement (i.e., at the forward end of a longitudinal slot), the suspension arms form a parallelogram with the snowmobile chassis and the slide rail so that upward movement of the front suspension arm is transmitted through the slide rail to the rear suspension arm, causing the slide rail to move upward in an orientation that is generally parallel to the snowmobile chassis. Thus, the front end of the slide rail cannot move higher than the back end of the slide rail. The longitudinal slot into which the lower end of the rear suspension arm is pivotally mounted permits the back end of these slide rails to move higher than the front end of the rails.

In light of the varying characteristics that can be built into a suspension system, a variety of competing suspension systems have been made commercially available, and different types of suspension systems commonly are employed on different types of machines, depending upon their primary usage (e.g., racing, touring, etc.). A need remains for an adjustable suspension system adaptable to perform across a variety of terrain and under diverse conditions.

BRIEF SUMMARY OF THE INVENTION

The present invention relates to a suspension system for a snowmobile that is adjustable by the rider to match the riding conditions and desired performance characteristics. In one embodiment, a system includes a slide rail for engagement with a lower portion of the snowmobile track and suspension arms mounted to the snowmobile chassis and the slide rail. Shocks and springs are provided for urging the slide frame downwardly away from the chassis. The front suspension arms have pivot connections at both ends, one end connected to the snowmobile chassis and the other end connected to the slide frame. The rear suspension arms are pivotally connected to the snowmobile chassis at upper ends and include a pivot connection at lower ends to the slide frame to permit some longitudinal movement of the lower end of the rear suspension arms with respect to the slide frame. An overload assembly provides an additional force tending to bias the slide rail away from the chassis. The overload force is applied at a location of the rear suspension arm between the upper and lower ends thereof. The position of the applied spring force can be user-adjusted, such as via a movable transfer block mechanism as further described hereinafter in order to modify performance characteristics of the snowmobile.

Benefits of a suspension incorporating one or more of the present inventions include: improved comfort; controlled machine attitude across a variety of operation speeds and conditions; and minimization of the change or variability of track tension across a variety of operational conditions.

One object of the present invention is the application of an overload force to a rear suspension arm at a location between the upper end and the lower end thereof.

Another object of the present invention is efficient user adjustment of the location of overload force application to control the force level transferred to the rear suspension arm.

Another object of the present invention is the application of a helical spring to provide the overload spring force. In one embodiment, the helical spring has an elongated spring arm for transferring the overload spring forces to the rear suspension arm.

Yet another object of the invention is the provision of a user-adjustable assembly for controlling overload force to a rear suspension arm. Suspension characteristics of the machine can be adjusted by changing spring force and/or transfer locations. In one embodiment of the present invention, a movable transfer block capable of sliding along the rear suspension arm is used to change the location of spring force transfer. A plurality of spaced apertures along the rear suspension arm provides a plurality of different positions for coupling the transfer block to the rear suspension arm, thereby providing an operator with a plurality of different suspension performance characteristics. An operator-accessible pin provides for efficient repositioning of the transfer block between locations along the rear suspension arm. In another embodiment of the invention, an overload spring force is applied at an upper extent of the rear suspension arms. An overload arm provides an overload force which is transferred to an rear suspension arm axle or directly to a rear suspension arm.

Yet another object of the present invention is the provision of a control means for selectively controlling a degree of mechanical coupling between rear and front suspension arms during various load conditions.

Yet another object of the present invention is the provision of a user-adjusted control means which provides a movable stop at different distances relative to ends of the rear suspension arms. Depending on the particular position of the movable stop, the degree of mechanical coupling between the front and rear suspension arms can be effectively controlled.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
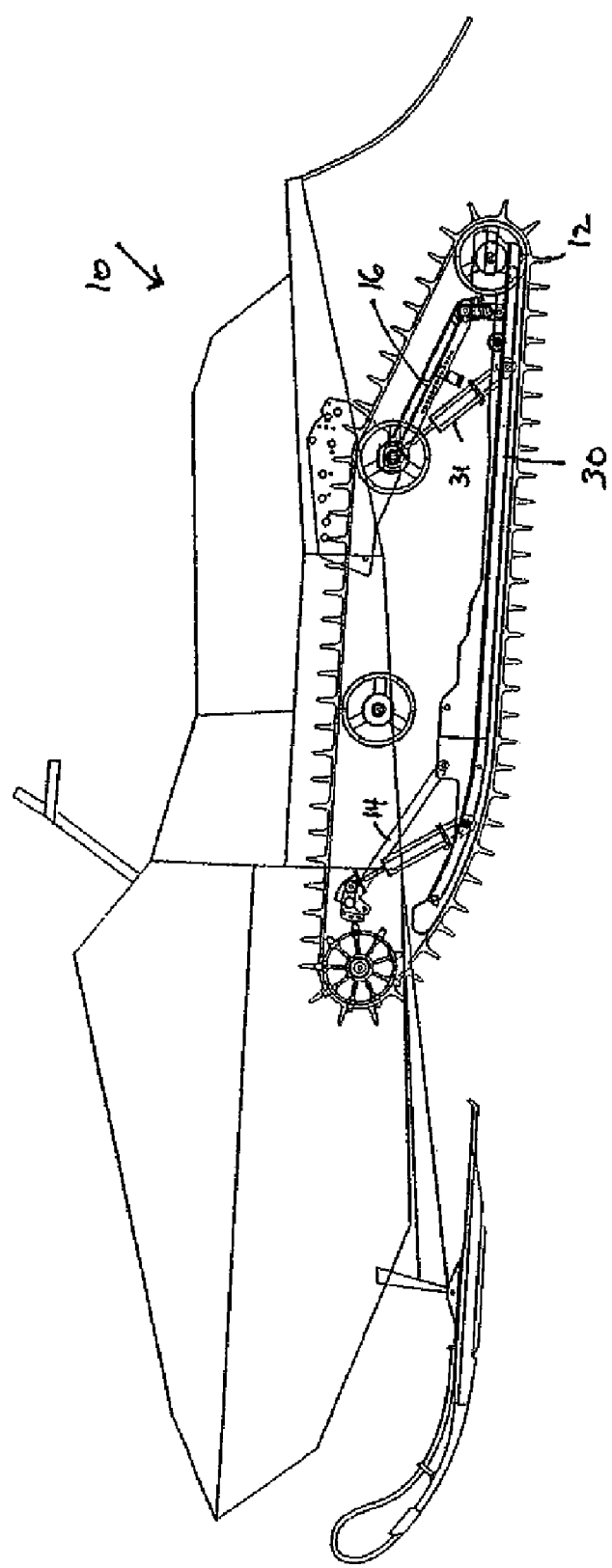
FIG. 1 is an illustration of a snowmobile in accordance with the present application.
Figure 2:
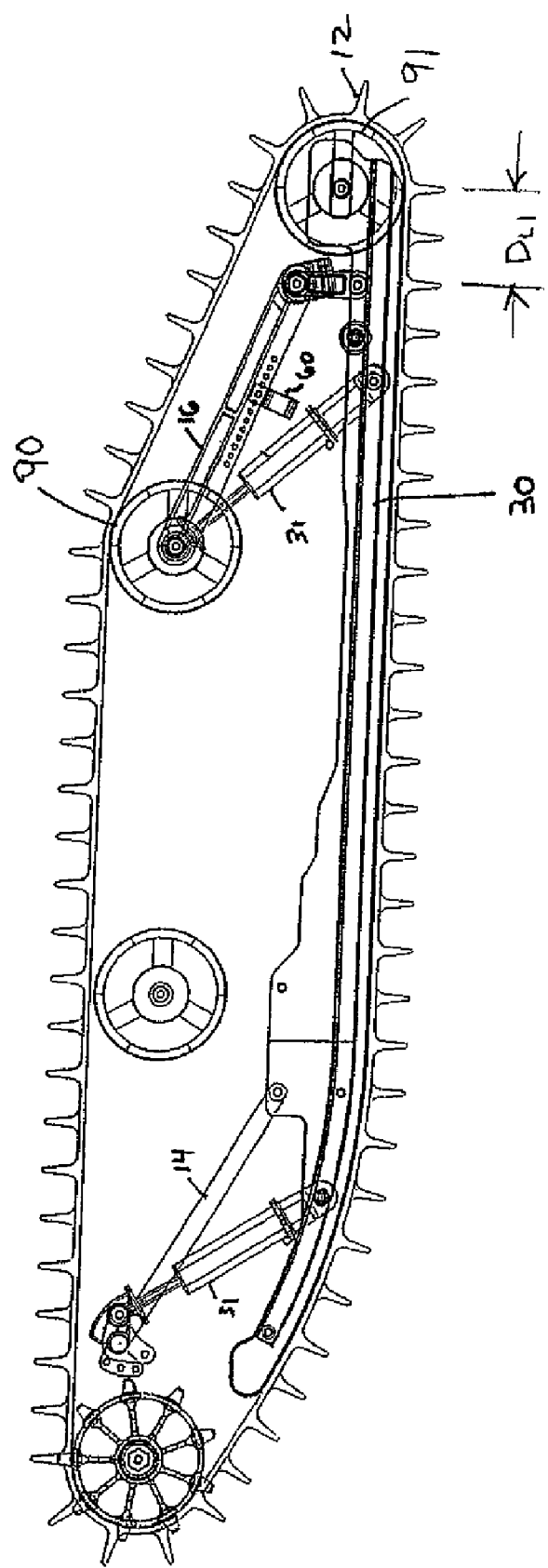
FIG. 2 illustrates a portion of the snowmobile of FIG. 1 including components of a rear suspension of the machine of FIG. 1.

Applicant has found that prior art suspension systems appear optimized for certain conditions, but perform less optimally in other conditions. For example, in relatively deep powder, it may be particularly desirable to permit the front end of the slide rail suspension to move higher than the rear of the suspension, making it somewhat easier for the snowmobile track to plane out or rise above the powdery snow. Similarly, deep powder handling and performance are related to the degree to which the back end of the slide rails is permitted to rise above the front end of the slide rails (or, in other words, the extent to which the machine is permitted to "rock backwards" on the suspension).

FIGS. 1-14 depict portions of a snowmobile 10 having a rear suspension system for supporting the machine and for defining the path of the track 12 which propels the machine across the snow. Although the invention can be utilized in connection with a variety of rear suspension configurations, the invention will be described in the context of a particular preferred rear suspension illustrated in the drawings. Such a suspension includes a front suspension arm 14 and a rear suspension arm 16, each arm extending downwardly and rearwardly from pivot connections to the snowmobile frame or chassis (often referred to as the "tunnel"). The lower end of each such arm 14, 16 is secured, either directly or indirectly, to the slide rail 30, beneath which the track slides. As the snowmobile tunnel obscures the rear suspension, FIGS. 2-14 depict the suspension elements as removed from the machine 10.

Figure 3:
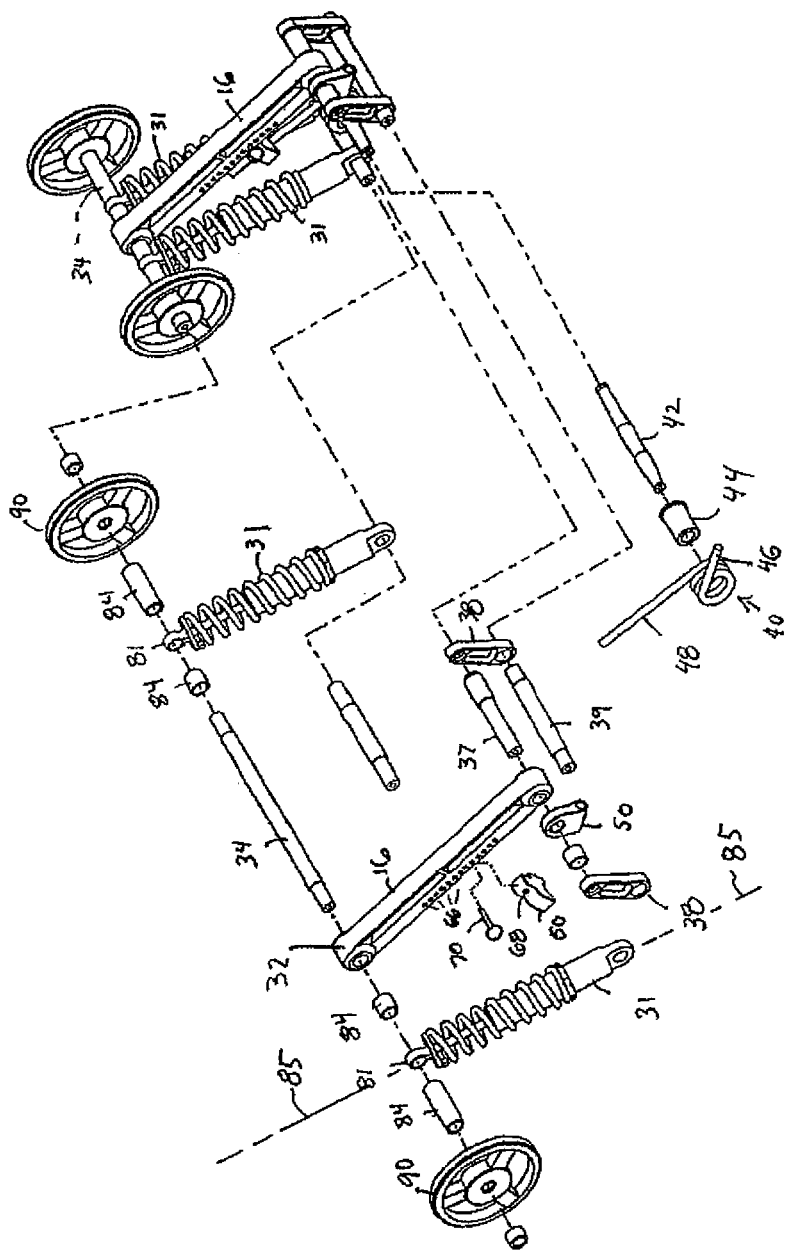
FIG. 3 is an illustration of a portion of the rear suspension of the snowmobile of FIG. 1 shown in assembled and exploded format.
Figure 4:
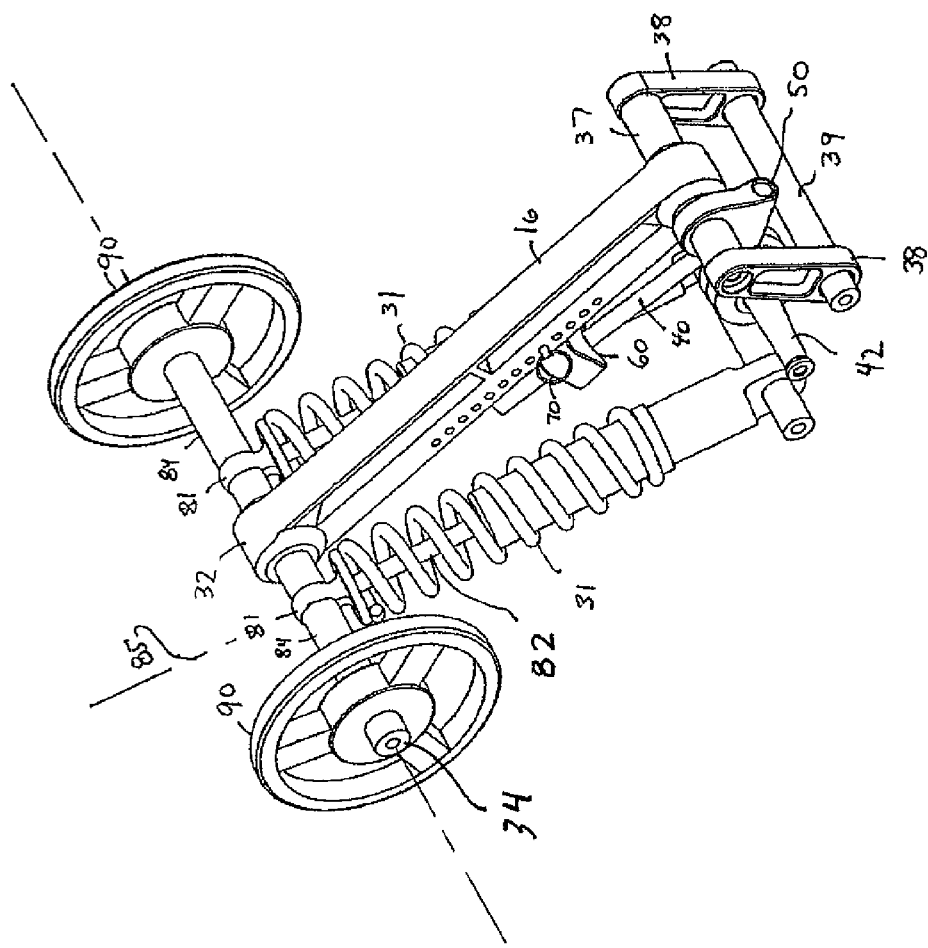
FIGS. 4-7 are illustrations of a portion of the rear suspension of FIG. 1.
Figure 5:
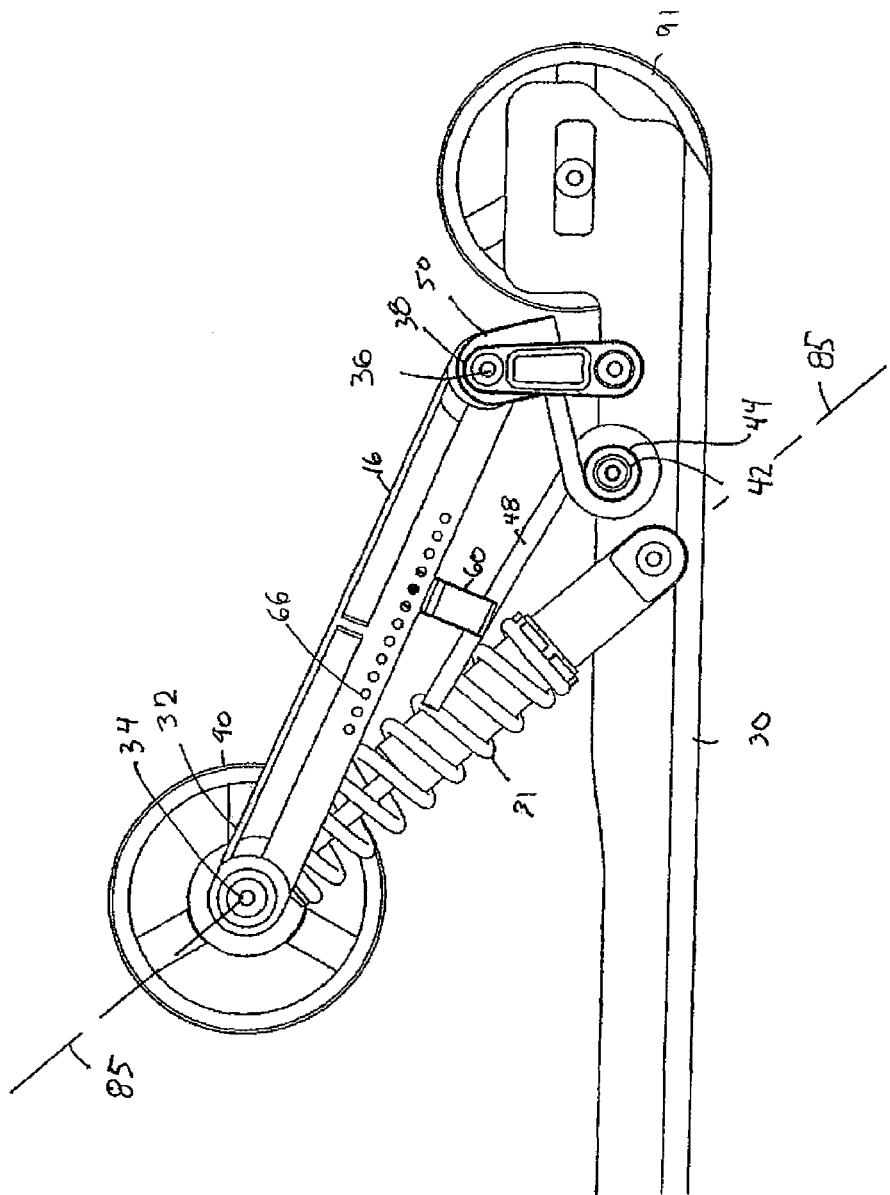
Figure 6:
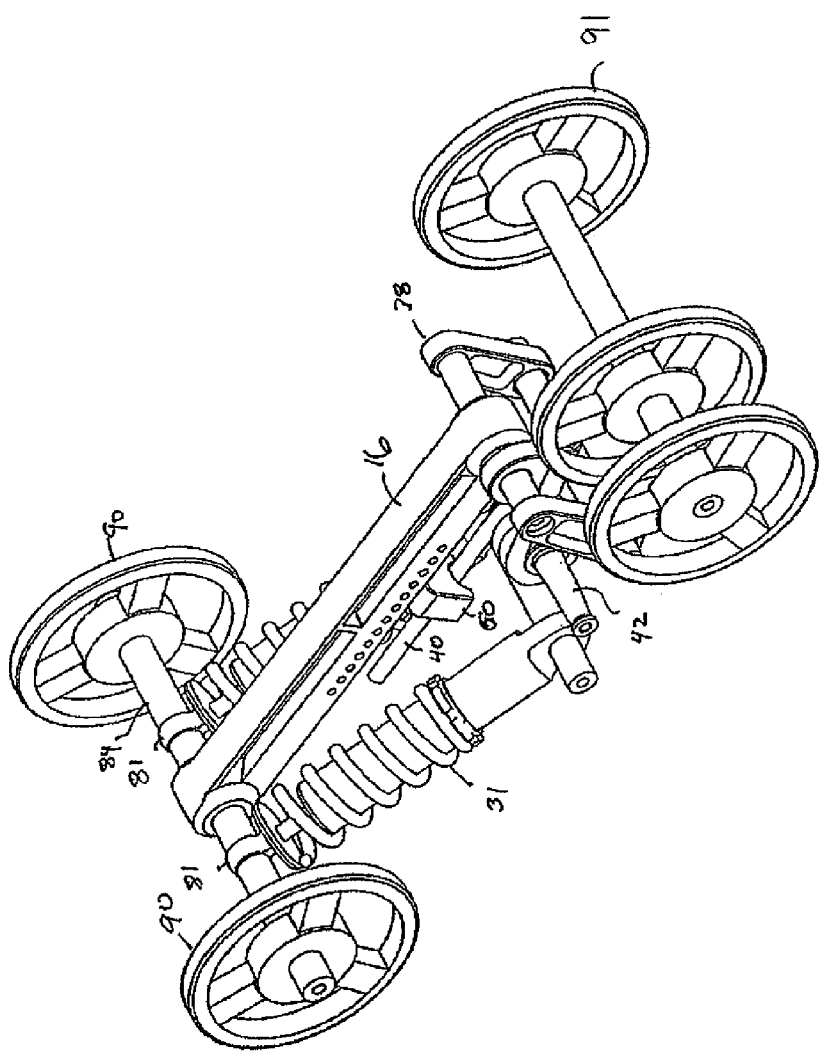

Springs and shock absorbers 31 are provided to urge the slide rail 30 down and away from the snowmobile tunnel. Springs and shocks 31 act to control the relative movement of the suspension with respect to the chassis as the snowmobile moves over terrain of varying contours. Preferably, the rear suspension arm 16 is centrally positioned between the pair of rear shock absorbers 31 as shown in FIG. 3. The relative lengths and orientations of the suspension arms 14 and 16 also control the movement and orientation of the suspension as it is compressed upwardly toward the chassis.

Figure 16:
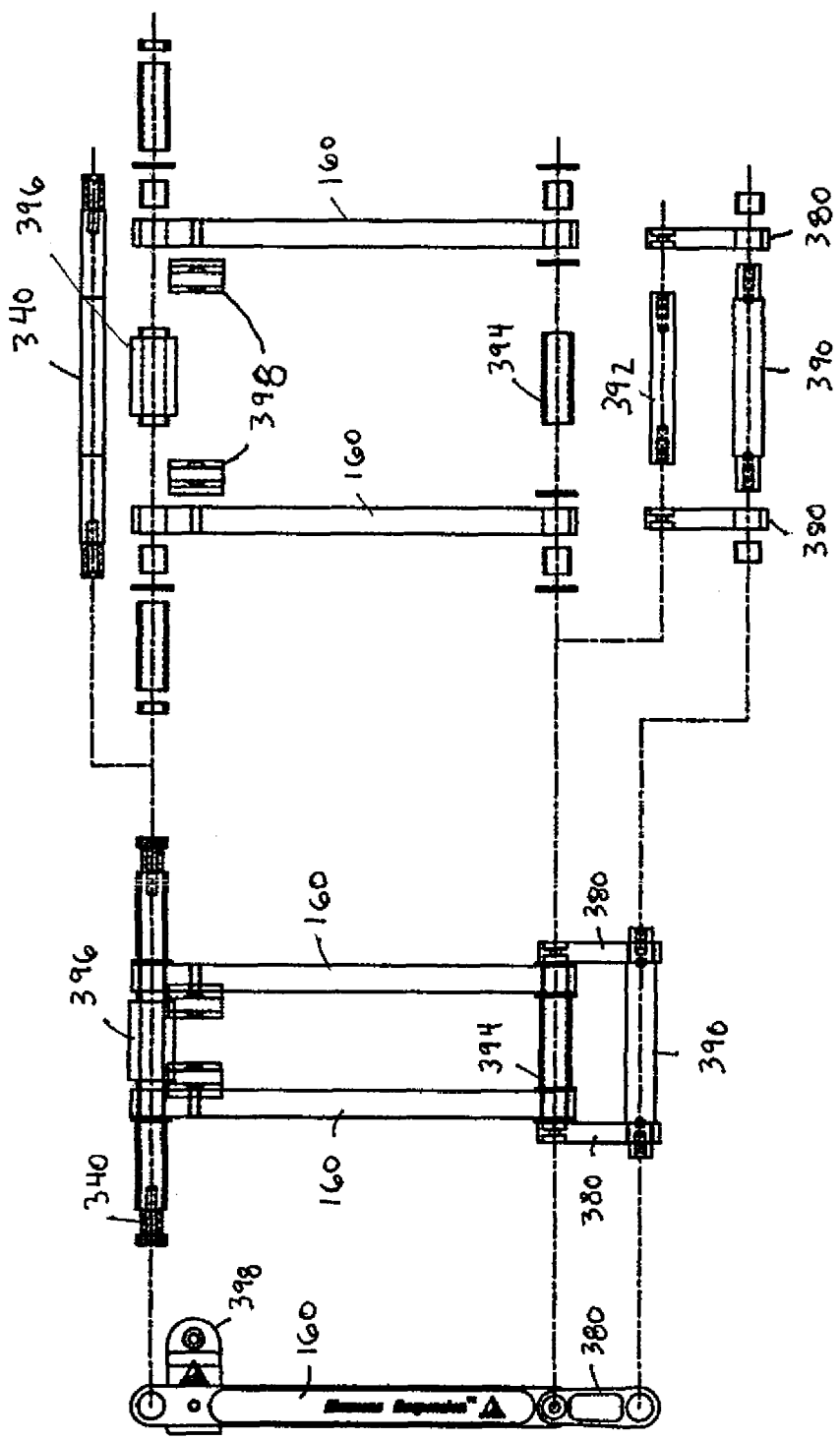
FIG. 16 is an assembly drawing illustrating portions of the rear suspension of FIG. 15.

Shock absorbers 31 are connected between upper axle 34 and slide rail 30. Shocks 31 include shock stem 82 attached to an upper shock mount 81. Shock mount 81 is retained upon upper axle 34 by a journal bearing, etc. and is generally free to rotate relative to upper axle 34. A plurality of spacers 84 position the upper shock mount upon axle 34. Shocks 31 compress and retract in a direction of elongation 85 which is aligned to generally intersect the center axis of axle 34. Shocks 31 include shock stems 82 which are aligned in the direction of elongation 85 so that shock stems 82 are aligned to generally intersect the center of axle 34. In comparison, the shock center of typical prior art suspensions is offset relative to the axle 34 as shown in FIG. 16. Similarly, the front shock of the suspension system of FIG. 16 is offset relative to the front axle.

Referring to FIGS. 2-5, upper end 32 of rear arm 16 is pivotally connected to the snowmobile chassis via upper axle 34. The lower end of arm 16 is connected to a pair of lower pivot arms 38, which in turn are pivotally connected to slide rail 30. The linkage of arm 16 with pivot arms 38 permits the front of the slide rail 30 to rise substantially independently of the rear portion of the slide rail. A pivot axis 36 is generally defined as the center of stub shaft 37. The lower ends of pivot arms 38 are pivotably couple to the slide rail 30 via shaft 39. Upper axle 34 also carries a pair of upper idler wheels 90. Rear idler wheels 91 are carried on the slide rail 30.

Figure 11:
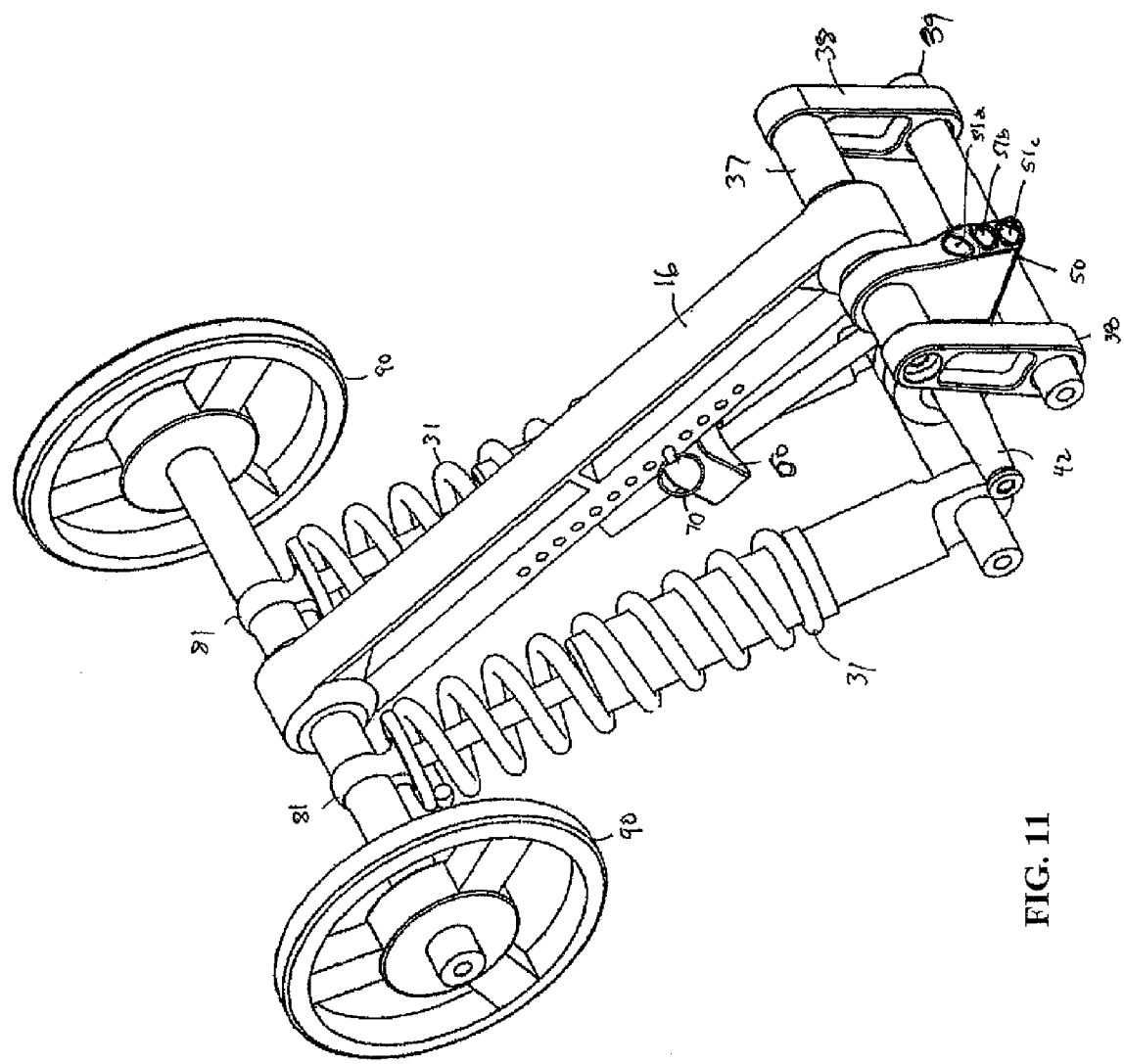
Figure 12:
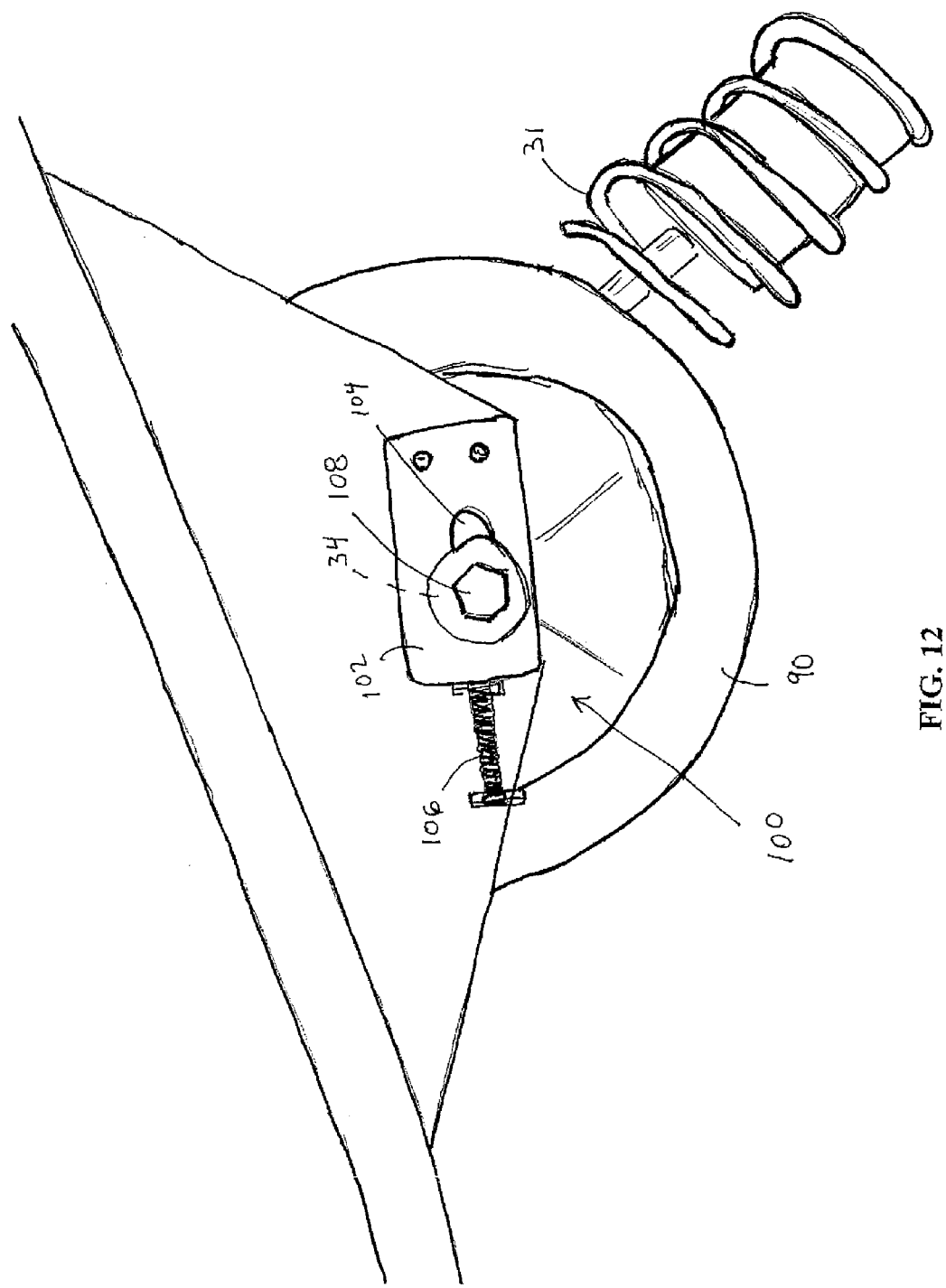
FIG. 12-14 illustrate portions of a rear suspension of a snowmobile.

Referring to FIGS. 5-9, the suspension system includes an overload spring 40 which provides an overload spring force to the rear suspension arm tending to bias the rear suspension arm away from the machine chassis. Overload spring 40 is shown as a helical coil spring connected to the slide rail 30 by a shaft 42 and bearing 44 and including a pair of extended spring arms 46, 48. A portion of arm 46 is received within and retained by a retainer 50 which is connected to stub shaft 37. Arm 46 may slide into and out of an aperture 51 of retainer 50 during machine operation. Retainer 50 is generally freely journaled about stub shaft 37. Another embodiment of spring retainer 50 is illustrated in FIGS. 11 and 12. In the embodiment of FIGS. 11 and 12, spring retainer 50 has a plurality of apertures 51a, 51b, 51c into which the portion 46 of spring arm 40 can be received. The spring force, F, applied to the rear suspension arm 16 can be varied by selecting a different aperture 51a, 51b, 51c. Alternative embodiments of a spring retainer 50 would be appreciated by those of ordinary skill in the art. For example, a spring retainer 50 may have opposed apertures 51 having different distances away from the shaft 37 so that the spring force is varied depending on the particular aperture chosen.

Referring again to FIGS. 5-9, arm 48 of overload spring 40 extends generally upwardly relative to the slide rail 30 and engages a transfer block 60 connected to the rear suspension arm 16. Arm 48 of spring 40 engages the transfer block 60 in a sliding relationship and transfers an overload spring force, F, to the rear suspension arm 16 tending to bias the slide rail 30 away from the chassis. Transfer block 60 slides within a channel 64 defined within suspension arm 16. A plurality of spaced apertures 66 are provided on suspension arm 16. Apertures 66 are sized relative to an aperture 68 of transfer block 60 and a removable retaining pin 70 so that pin 70 is capable of retaining the transfer block 60 at an intermediate location between the upper end and lower end of rear suspension arm 16.

Figure 7:
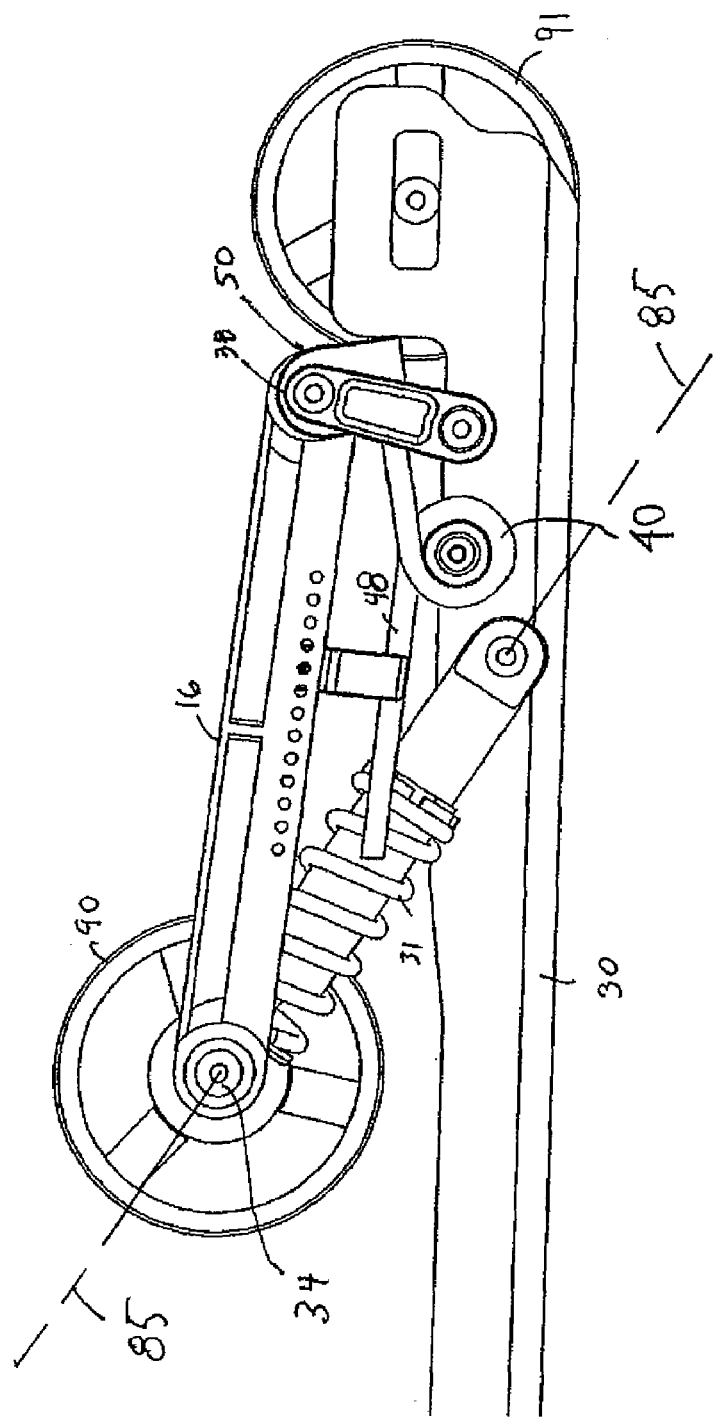
Figure 8:
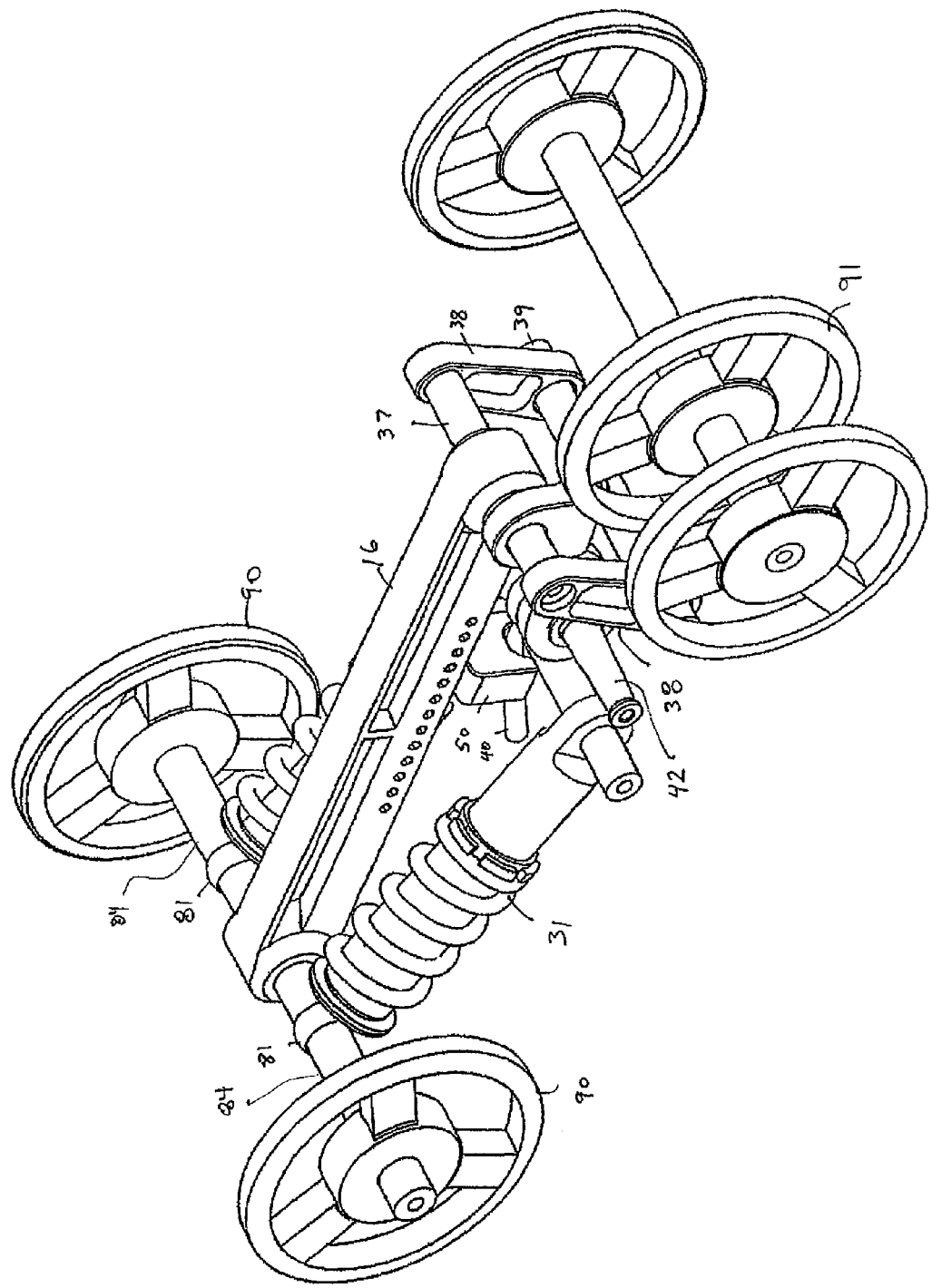
FIG. 8 illustrates components of the rear suspension in a compressed state.
Figure 9:
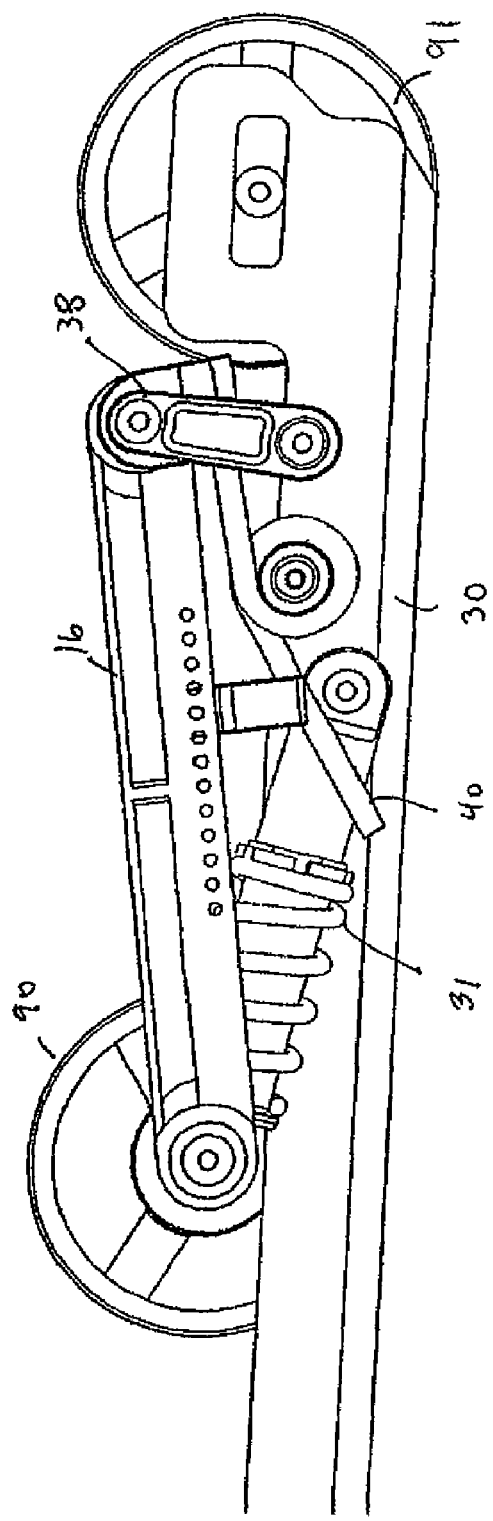
FIG. 9 illustrates components of the rear suspension in a fully compressed state.
Figure 10:
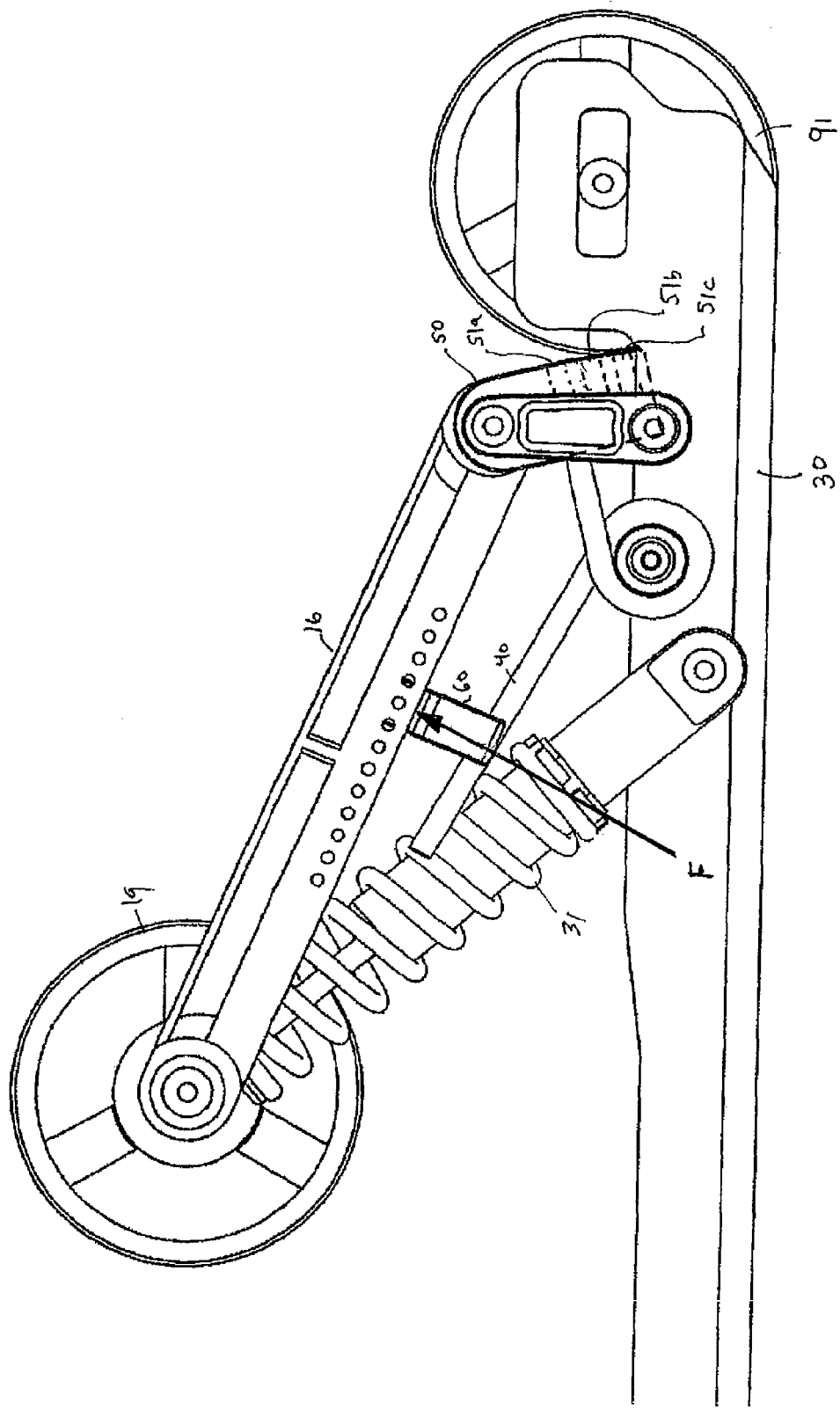
FIGS. 10 and 11 illustrate another embodiment of a rear suspension in accordance with the present invention.

FIGS. 7 and 8 depict the rear suspension in a load-carrying condition. FIG. 9 depicts the rear suspension at a fully compressed load-carrying condition.

Figure 13:
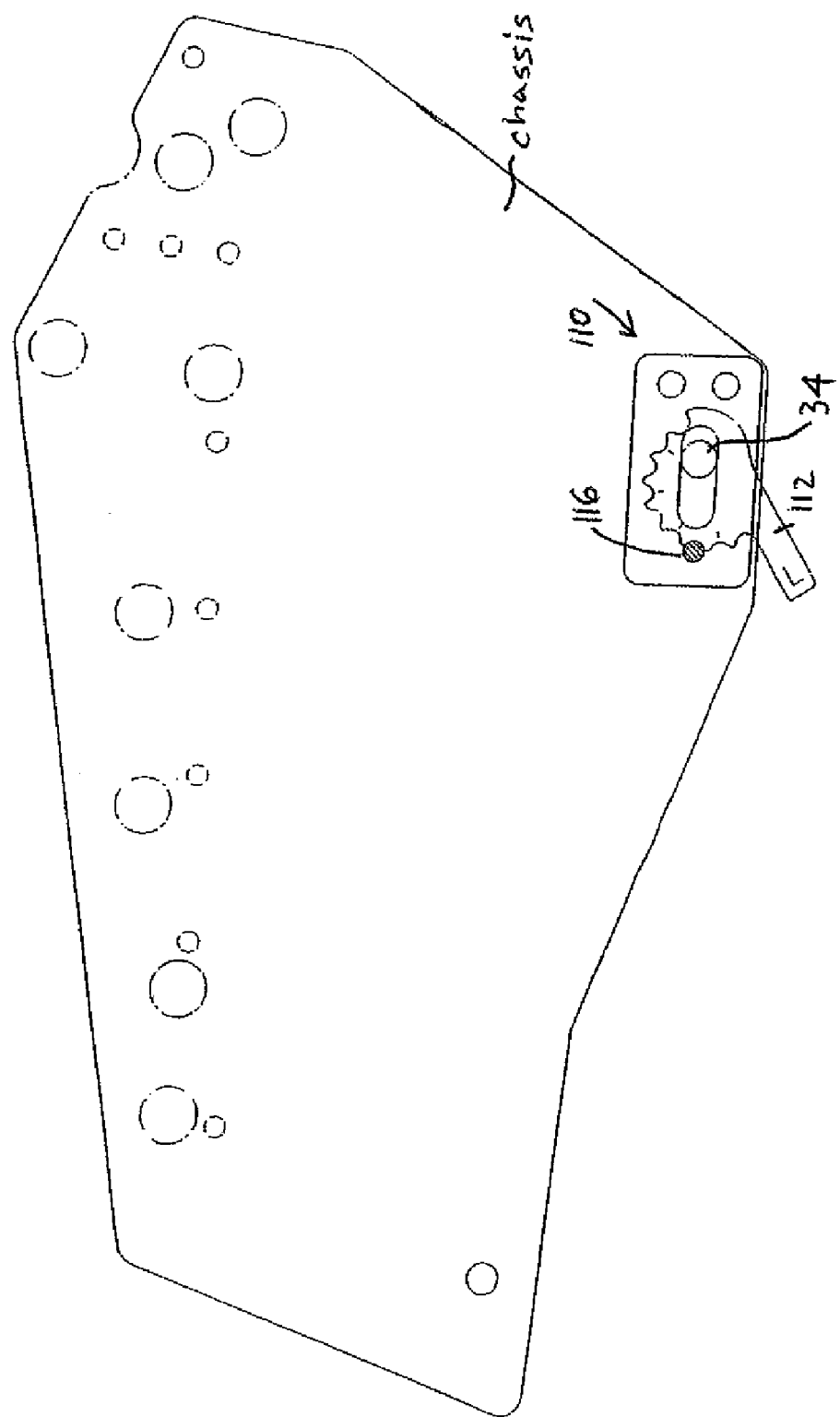
Figure 14:
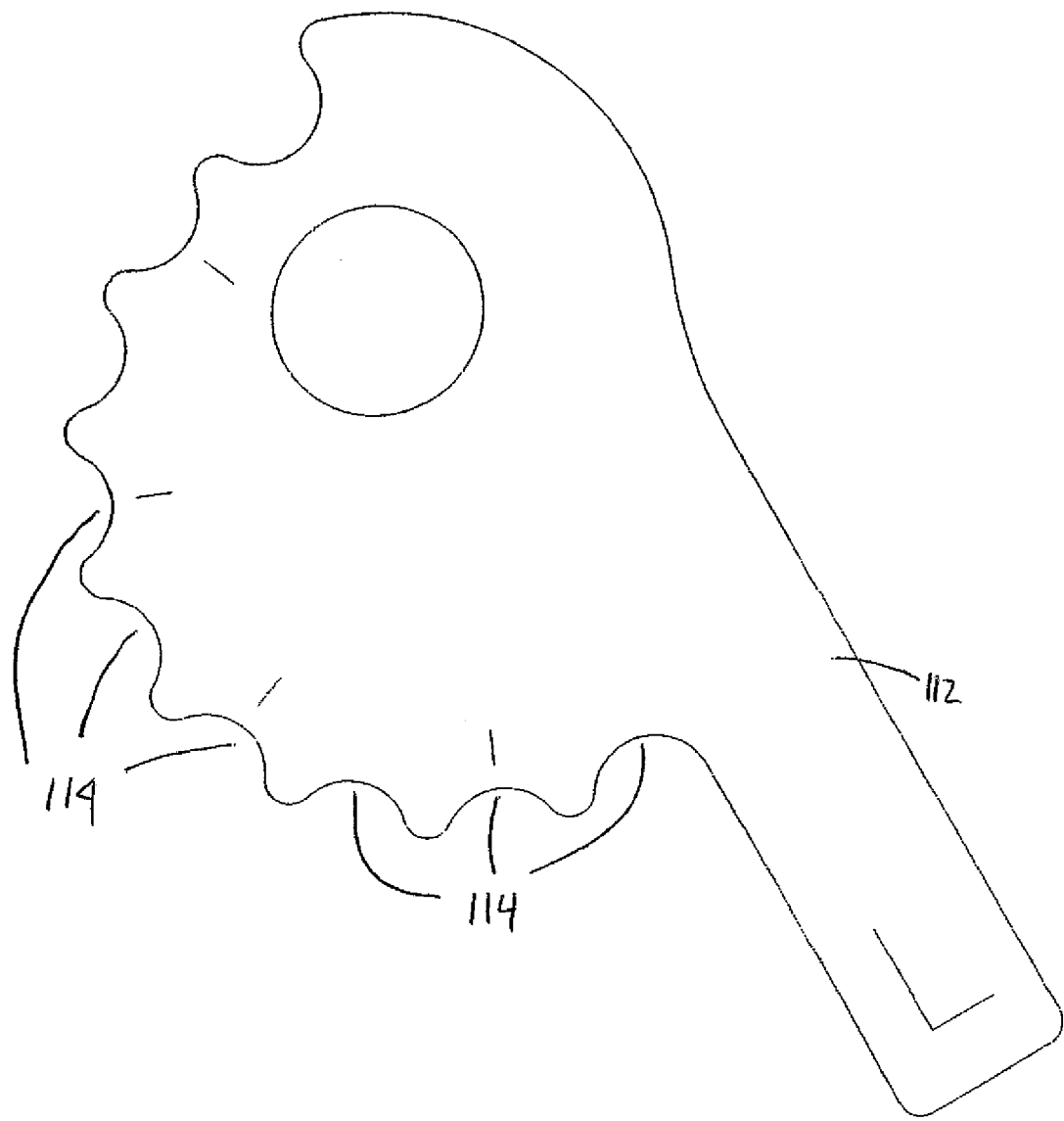

FIGS. 13 and 14 illustrated another embodiment of an upper shock adjuster, generally indicated as numeral 110. Upper shock adjuster 110 includes a plate 112 having a plurality of stops 114 which are differently spaced from a center 114. Stops 114 engage a pin 116 coupled to the chassis. Axle 34 engages the plate center 114 so that as plate 112 is rotated the distance between the axle 34 center and the pin 116 changes. A duplicate assembly would be located at the opposite end of axle 34 (not shown) and together the assemblies 110 would be used to position the axle 34 relative to the chassis. As the rear suspension arm 16 and shock absorbers 31 are directly coupled to axle 34, the movement of axle 34 relative to chassis also adjusts the angular orientation of the rear suspension arm 16 and the shock absorbers 31 relative to the chassis. A threaded fastener (not shown) similar to the second threaded fastener 108 of FIG. 12 can be used to secure the plate 112 to the chassis and temporarily fix the orientation of axle 34, shock absorbers 31 and rear suspension arm 16 relative to the slide rail 30.

One aspect of the present invention is the application of an overload spring force to a downwardly angled rear suspension arm 16 at an intermediate location between the upper end and the lower end thereof. The operator is afforded efficient adjustment of the location of the overload spring force application by manipulation of a user-adjustable transfer block 60. Upon removal of pin 70, the transfer block 60 is capable of sliding along the rear suspension arm 16 during repositioning to change the location of spring force transfer. The use of a plurality of spaced apertures 66 along the rear suspension arm 16 provides a plurality of positions for coupling the transfer block 60 to the rear suspension arm 16. Movement of the transfer block 60 along the rear suspension arm 16 effectively changes the level of spring force applied by the overload spring 40 to the rear suspension arm 16. For example, the spring force will be greater when the transfer block 60 is closer to the spring 40 center and decrease as the transfer block 60 is positioned further away along the rear suspension arm 16.

FIGS. 15-19 illustrate another embodiment of a suspension system of the present invention. In this embodiment, the overload force is applied via a pivoting overload arm 400. The overload force is transferred to the rear suspension arm only after a predetermined compression of the suspension system.

Figure 15:
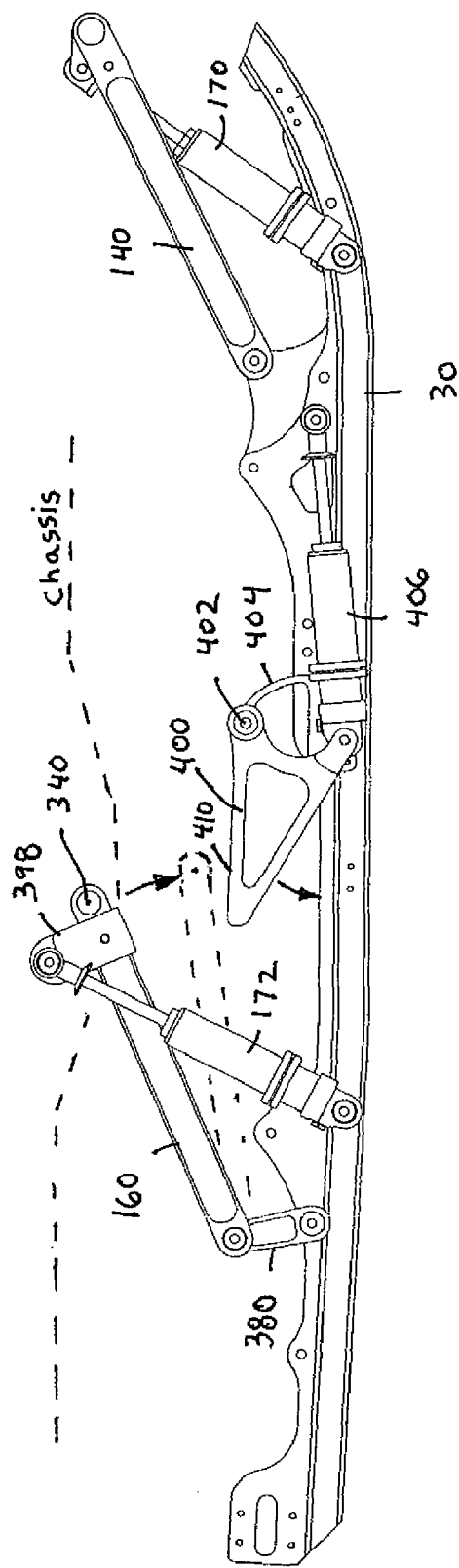
FIG. 15 is a side elevational view of another embodiment of a suspension system of a snowmobile in accordance with the present invention.

FIG. 15 illustrates a side elevational view of aspects of a second embodiment of a snowmobile suspension system of the present invention. Slide rail 30 is movably coupled to a snowmobile chassis via front and rear suspension arms 140, 160. Each of a pair of front suspension arms 140 is pivotally connected at one end to the chassis and at the other end to the slide rail 30. A front shock 170 is connected between an upper end of front suspension arm 140 and slide rail 30. A rear shock 172 is connected between slide rail 30 and a shock mount 398. Shock 170, 172 may include coil-over springs (not shown for clarity purposes) or may be an air-shocks without a coil-over springs.

FIG. 16 is an exploded view of portions of the suspension system of FIG. 15. Each of the pair of rear suspension arms 160 is pivotally connected at one end to the snowmobile chassis via an upper axle 340 and to a movable lower pivot arm 380. Pivot arms 380 are pivotally connected to slide rail 30 via shaft 390 and to rear suspension arms 160 via upper shaft 392. Covers 394, 396 are provided over shafts 392, 340, respectively. Covers 394, 396 are preferably of resilient construction. Portions of an upper shock mount 398 are also connected near an upper end of the rear suspension arms 160.

Referring again to FIG. 15 the suspension system includes an overload arm 400 for providing an overload force to the rear suspension arm assembly during certain operating conditions. Overload arm 400 is pivotally supported relative to slide rail 30 via a pivot 402 provided on arm support 404. A shock assembly 406 is coupled between the overload arm 400 and the slide rail 30. The overload arm 400 includes an engaging surface 410 which engages upper axle 340 during certain overload conditions. In a light load condition, the overload arm 400 is spaced away from the rear suspension arms 160 and not engaged by shaft 340. As depicted by the phantom lines in FIG. 15, rear suspension arm 160 rotates during operation of the snowmobile and depending on the load conditions the overload arm 400 is engaged by the rear suspension arm assembly. Such contact between overload arm 400 and the rear suspension arm assembly causes rotation of the overload arm about pivot 402. As rotation of the overload arm is controlled via shock assembly 406, a force tending to resist motion between the chassis and the slide rail 30 is transferred via overload arm 400.

Figure 17:
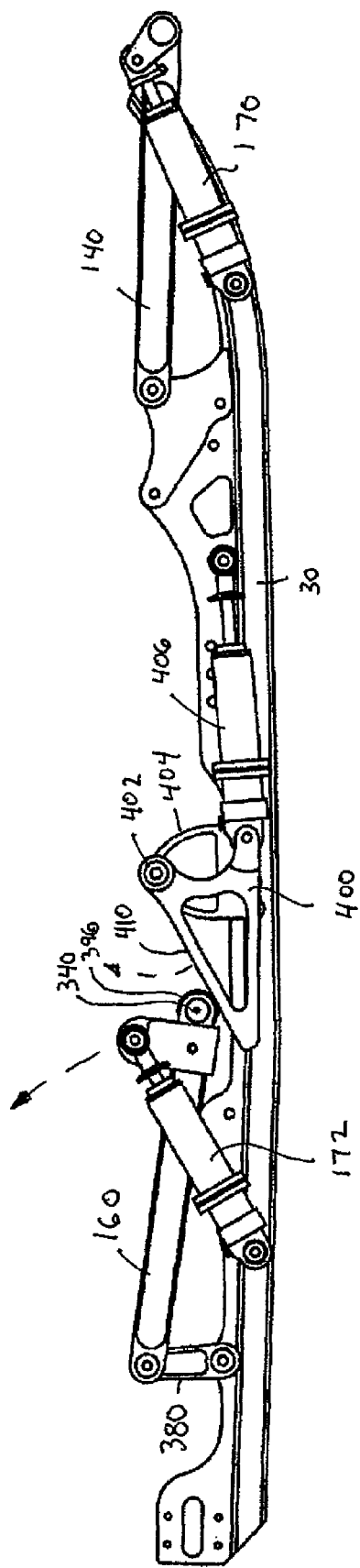
FIG. 17 is a depiction of the suspension assembly of FIG. 15 as under a fully loaded condition.

FIG. 17 is a side view of the suspension assembly of FIG. 15 depicted in a fully loaded condition. As shown, the overload arm 400 has been rotated about its pivot 402 by engagement with the upper axle 340/upper end of the rear suspension arms 160. The cover 396 on upper axle 340 is in sliding contact with a flat portion of the engaging surface 410. As depicted, the overload spring assembly 406 provides a force tending to resist collapse of the rear suspension assembly into the configuration of FIG. 17.

Figure 18:
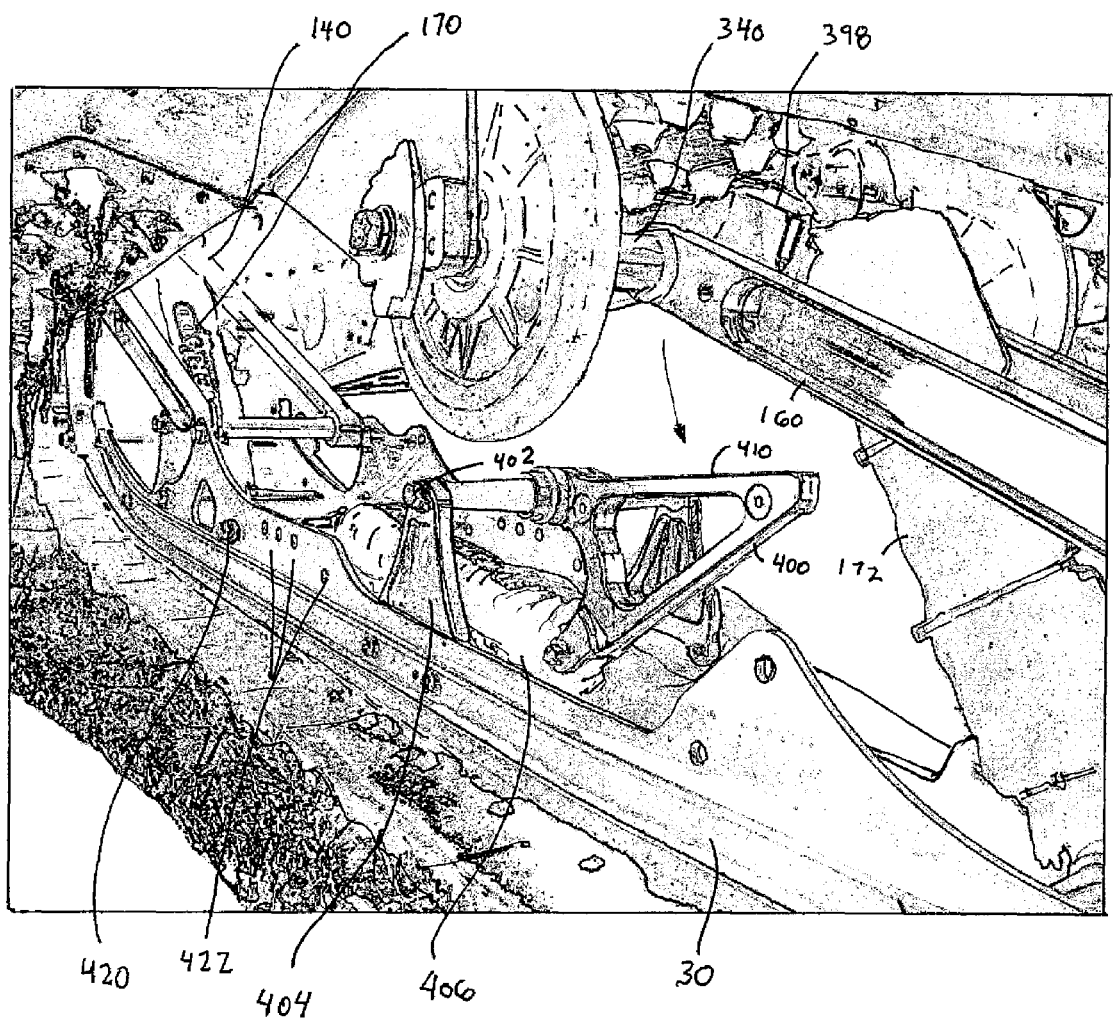
FIG. 18 is a perspective view of the suspension assembly of FIG. 15.

FIG. 18 is a perspective view of a snowmobile having the suspension system of FIG. 15. The connection between the second shock assembly 31 and the slide rail 30 may be adjusted by repositioning a shaft 420 between different apertures 422 of the slide rail 30. By changing the location of shaft 420, the overload arm 400 is rotated about its pivot 402. Adjustments to overall ride/performance characteristics of the snowmobile may be made by adjusting this connection between the slide rail 30 and shock assembly 406.

FIG. 18 also illustrates that the shock assembly 172 is positioned between the pair of rear suspension arms 160. The suspension system of FIG. 15 includes single rear shock assembly 172 coupled between the slide rail 30 and the rear suspension arm assembly. In other embodiments, two or more shock assemblies may be utilized to control movement of the rear suspension arm assembly.

The shock assembly 406 provides a force tending to resist movement of the overload arm 400. In one embodiment of the invention, the shock assembly 406 provides a controlled damping force tending to resist movement of the rear suspension arm assembly in a vertical direction. The shock assembly 406 controls movement of the rear suspension arm assembly during certain load conditions. Once the suspension system is released from a collapsed condition, the shock assembly 406 may not necessarily provide a force to the rear suspension arm 160 tending to restore the rear suspension arm assembly into a pre-load condition. That is, the shock assembly 172 may accelerate the rear suspension arm assembly away from contact with the overload arm 400. In this regard, the overload arm and shock assembly 406 may provided a controlled application of forces tending to resist movement of the rear suspension arm assembly in one or both directions of collapse and return.

In the embodiment of FIGS. 15-18, the overload arm 400 transfers an overload force tending to resist motion of the slide rail 30 toward the chassis. In this embodiment, the axle 340 is positioned at the end of rear suspension arms 160. In other example, the overload force applied by overload arm 400 could be transferred away from the end of the rear suspension arms 160. For example, the overload arm 400 could be extended to contact the rear suspension arms 160 between its upper and lower ends. While the contact between overload arm 400 and axle 340 includes a sliding motion, in alternative embodiments a roller can be attached to axle 340 allowing the roller to roll along the engaging surface 410 of overload arm 400.

Figure 19:
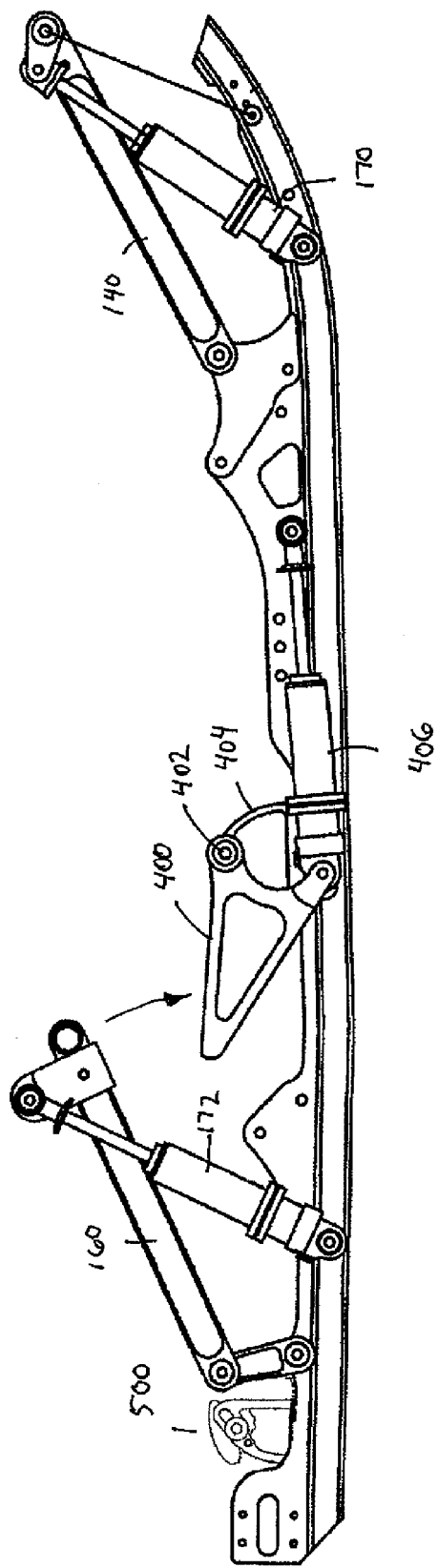
FIG. 19 is a side elevational view of another embodiment of a suspension system in accordance with the present invention.

FIG. 19 illustrates another embodiment of a suspension assembly further include an adjustable control means 500 for selectively coupling the front and rear suspension arms 160, 140 during certain operational load conditions. As described herein, contact is only made between the control means 500 and the rear suspension arm assembly during particular load operations.

Figure 20:
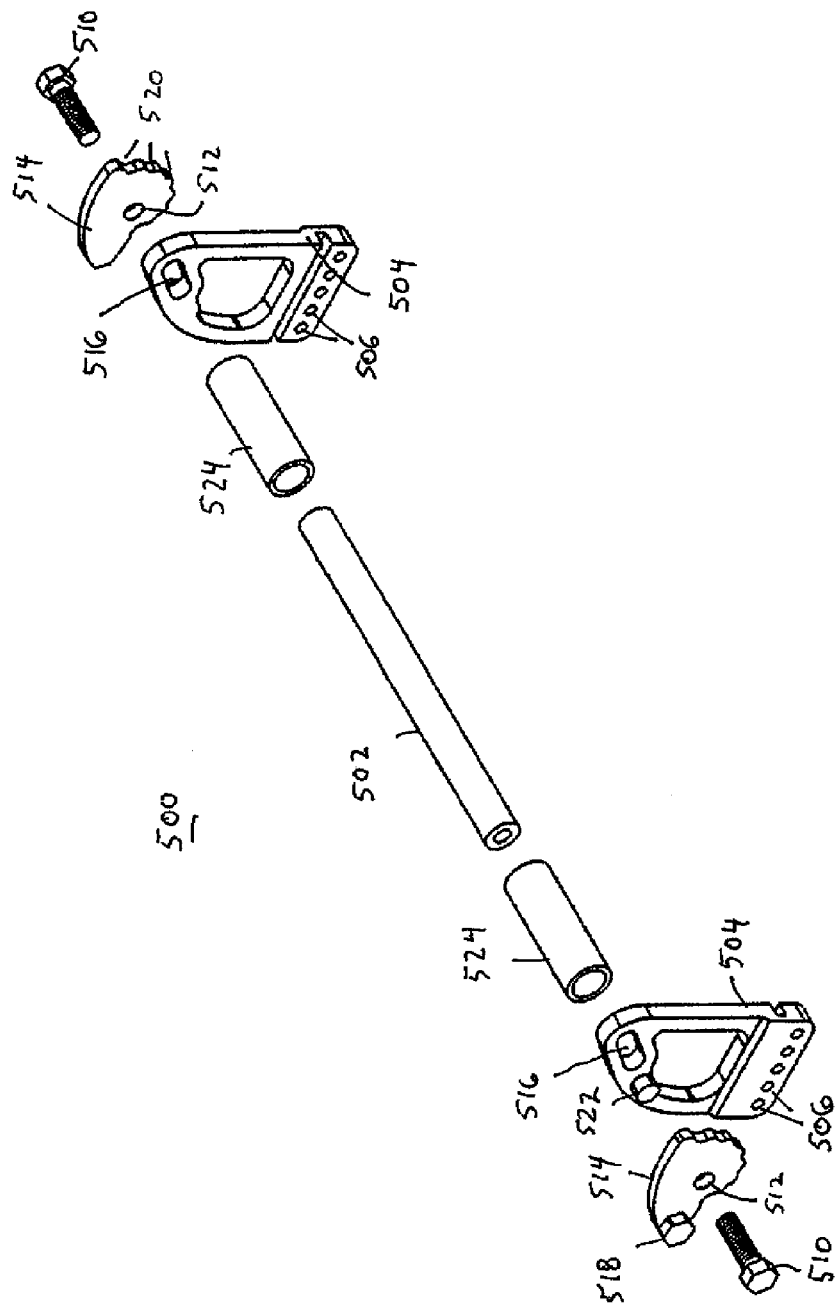
FIG. 20 is a perspective view of elements of a control means within the suspension system of FIG. 19.

FIG. 20 is a perspective view of components of control means 500. A shaft 502 is held between a pair of supports 504 which are coupled to the slide rail 30 via threaded fasteners (not shown) passing through apertures 506 of the supports 504. Ends of shaft 502 are threaded and receive portions of threaded fasteners 510 which pass through an aperture 512 on adjuster plates 514 and through angled slot apertures 516 on the supports 504. The adjuster plates 514 include a hex coupling 518 for engaging a standard hex socket or wrench during an adjustment procedure. The adjusters 514 include a plurality of stops 520 which are spaced with varying degrees relative to aperture 512. Control means 500 includes a pair of pins 522 which engage stops 520. A resilient cover 524 on shaft 502 engages portions of the rear suspension arm assembly during certain load conditions. Cover 524 prevents a hard contact between portions of the rear suspension arm assembly and shaft 502.

As a result of the stops 520, the adjusters 514 have a tendency to rest when stops 520 are aligned with pins 522. Thus, since the adjusters 514 tend to stop wherever a new stop 520 is encountered, this arranged can be termed "indexed." An indexed mechanism is simpler to use and allows the user to visually confirm that the adjusters 514 have been correctly set.

Figure 21:
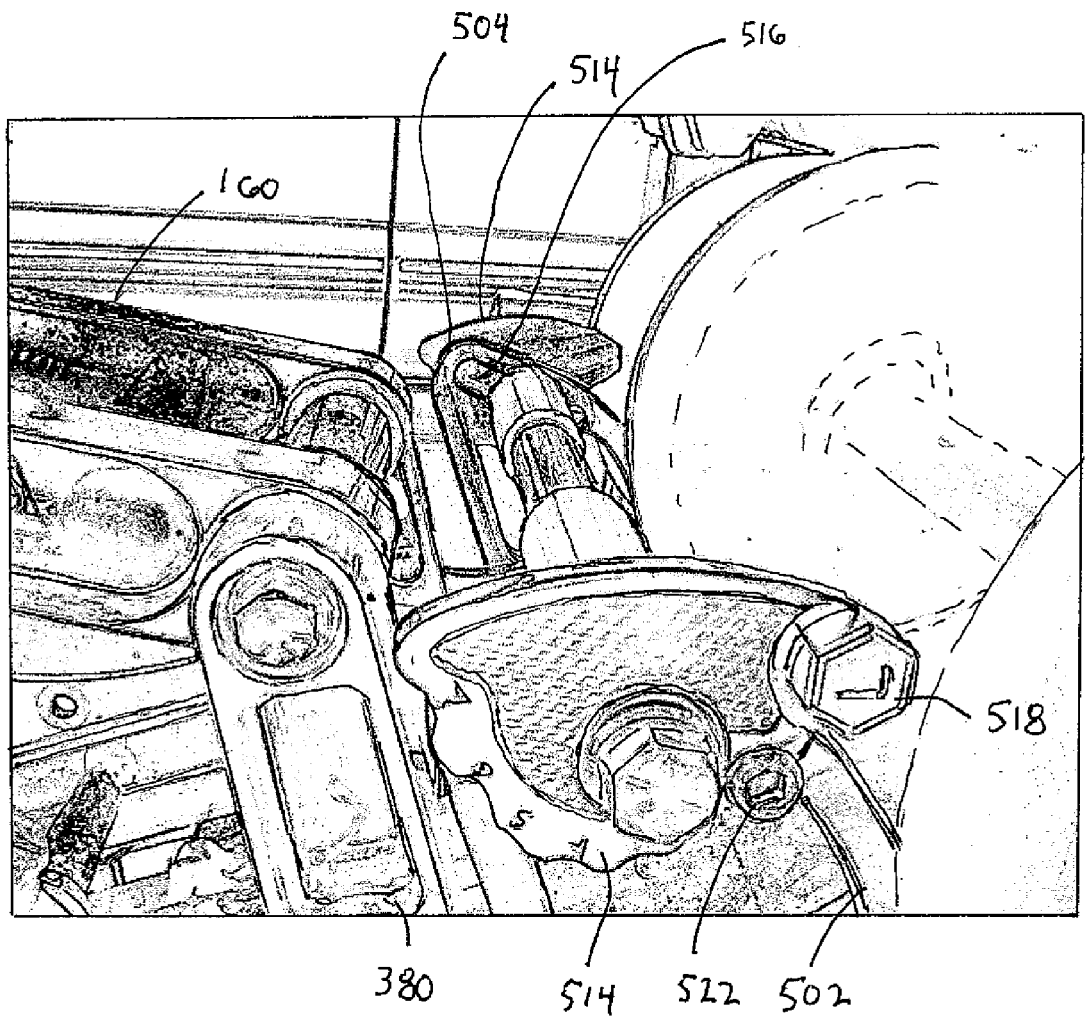
FIGS. 21-23 are perspective views of the control means of FIG. 20 shown under different operating orientations.
Figure 22:
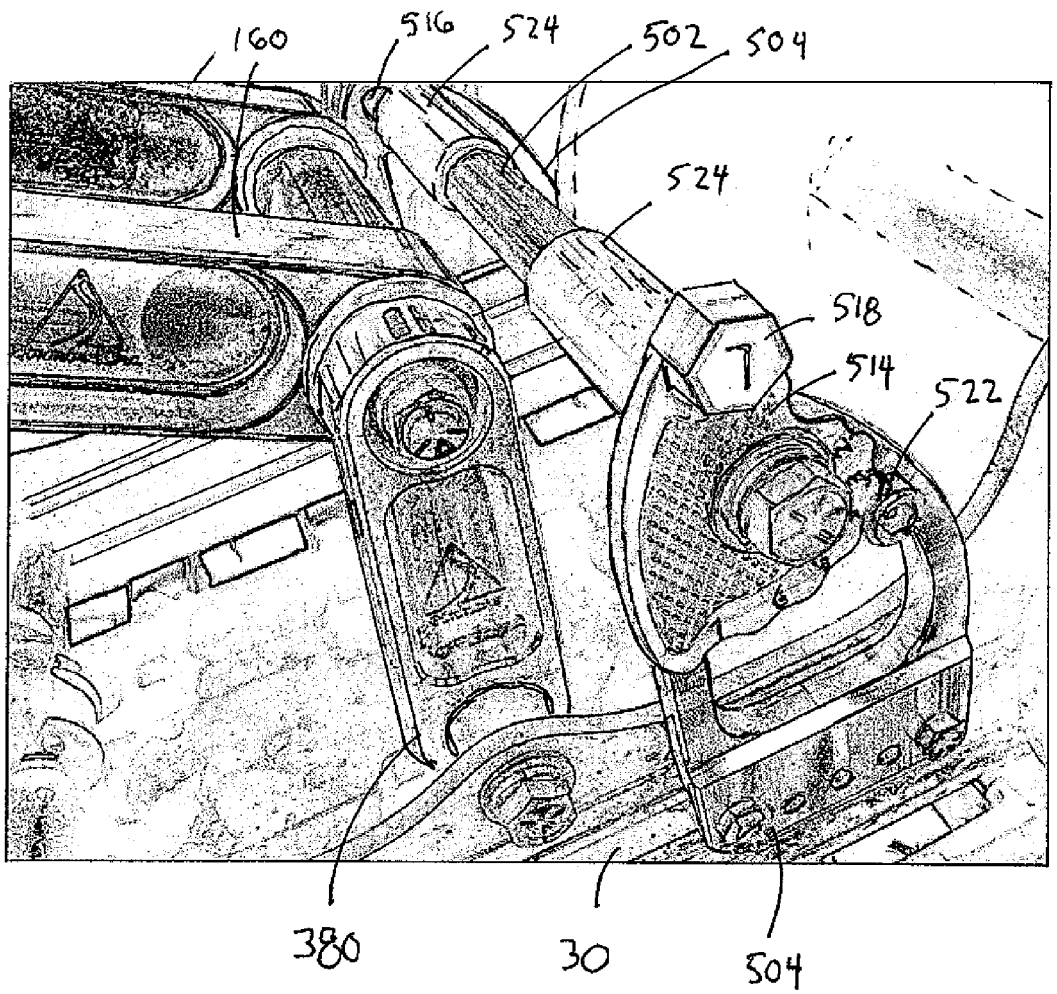
Figure 23:
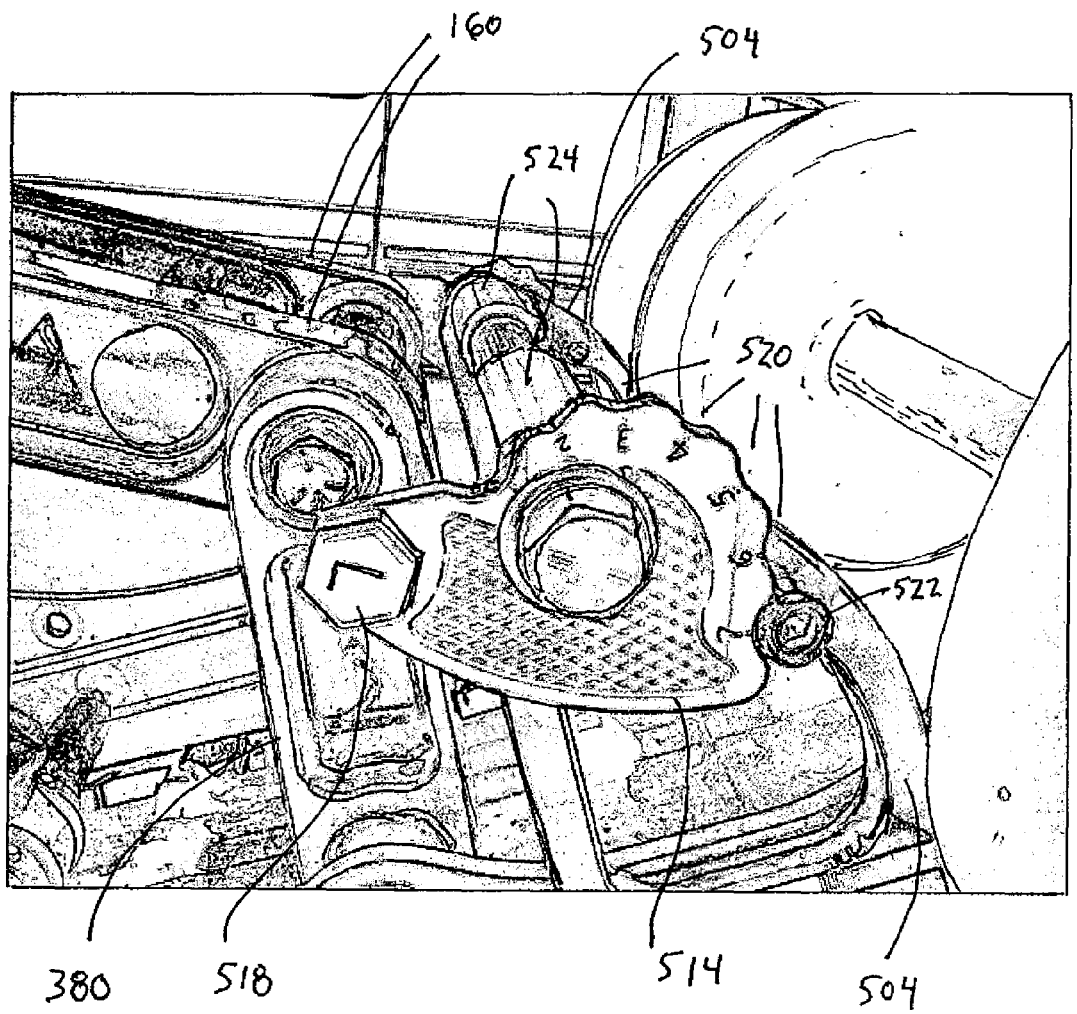

FIGS. 21-23 are perspective views of the adjustable control means 500 on a suspension assembly shown in different configurations whereby adjusters 514 have been rotated to move shaft 502 forward (toward the machine front). To move adjusters 514, fasteners 510 are first loosened and hex coupling 518 is then engaged by a wrench or socket and adjusters 514 are rotated about the fasteners 510 into a desired position. The fasteners 510 are then secured to retain adjusters 514 in the desired position.

While the control means 500 is preferably operated using a hex socket or wrench coupled to hex coupling 518, it should be noted that it is also possible to rotate axle adjusters 514 by means of a remote mechanism. For example, the adjusters 514 could be rotated via a hydraulic system. Other systems involving pneumatic actuation or push-pull cables could be implemented to allow the rider to adjust the suspension while seated on the snowmobile.

Figure 24:
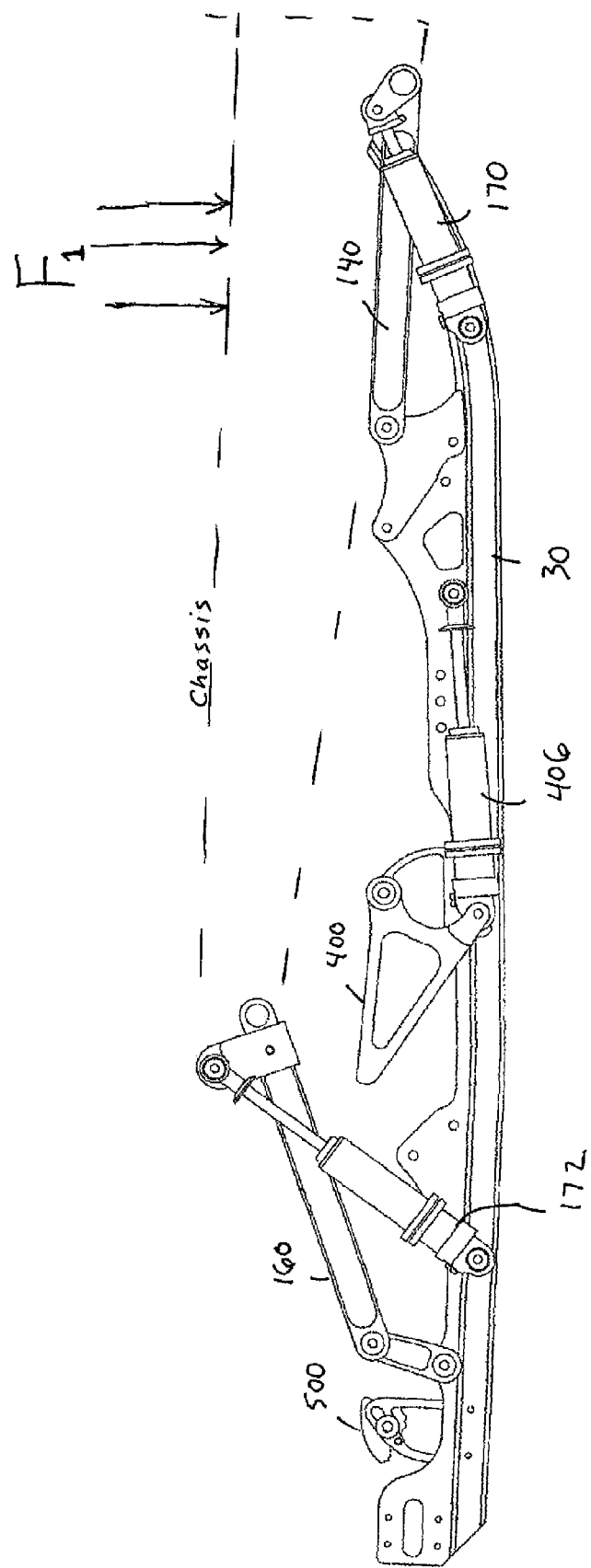
FIGS. 24-26 are depictions of the suspension system of FIG. 15 under certain load conditions.

FIG. 24 depicts the suspension assembly and slide rail 30 after a forward-located force, F1, has collapsed the front suspension arm 140. Under such a load condition, the control means 500 does not engage the rear suspension assembly and rear suspension arms 160 are free to move independently relative to the front suspension arms 140. The suspension assembly would also assume this orientation under a loading condition with a generally centrally-located force.

Figure 25:
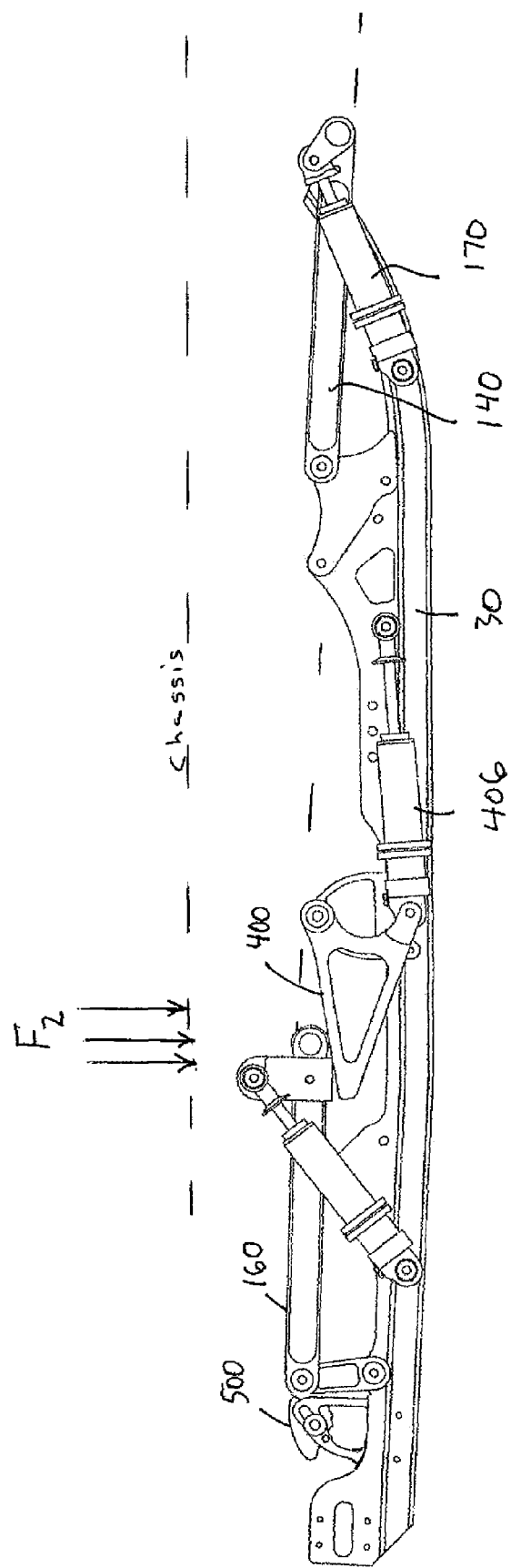

FIG. 25 depicts the suspension assembly and slide rail 30 after a rearward-located force, F2, has collapsed both the rear and front suspension arms 160, 140. Such a force may be generated, for example, during machine acceleration, operating in a steep climb or across large moguls or other aggressive terrain. As force F2 is applied, the rear suspension arms 160 rotate toward slide rail 30 and contact is made between the suspension arms 160 and the control means 500. Further application of force, F2, results in a "coupling" of the rear suspension arms 160 with the front suspension arms 140. As a result of this coupling effect, the front suspension arms 140 are forced to rotate toward the slide rail 30 as the rear suspension arms 160 are further loaded. Under such conditions, forces are transferred via the chassis tunnel causing the front suspension arms 140 to rotate toward the slide rail 30 as the rear suspension arms are further rotated under the load of force, F2.

Figure 26:
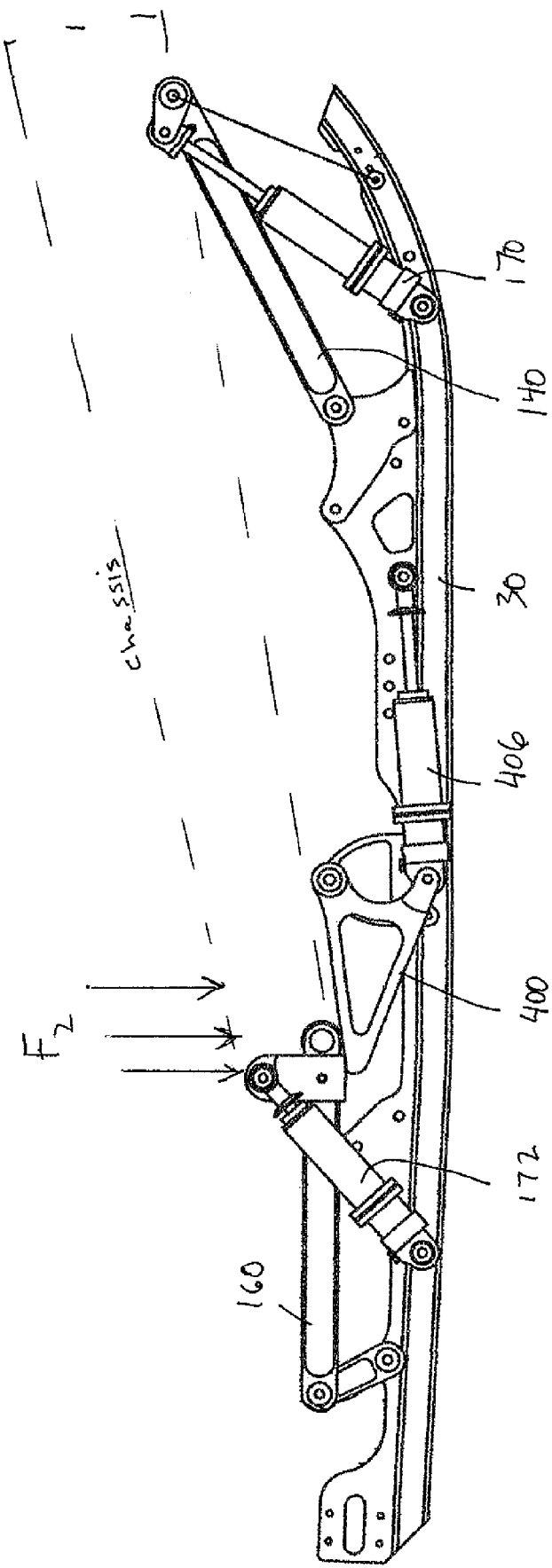

FIG. 26 is provided for comparison purposes and illustrates the suspension assembly of FIG. 25 but without the control means 500. FIG. 25 depicts an operating condition where a force, F2, is applied to a rear portion of the assembly. Without the coupling effect provided by control means 500, the front suspension arms 140 are not forcibly biased toward the slide rail 30 as depicted in FIG. 25.

In many load conditions, contact is not made between control means 500 and the rear suspension assembly. That is control means 500 does not limit the range of motion of rear suspension arms 160. However under some conditions, when contact is made between control means 500 and the rear suspension arm assembly, a coupling is generated between the rear suspension arms 160 and the front suspension arms 140. The degree of inclination lower pivot arm 380 is allowed before the suspension becomes coupled is a function of overall suspension system geometry and the orientation of the adjustable control means 500. By providing a selective control means 500, the rider is able to efficiently adjust the snowmobile suspension based on anticipated operating conditions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A snowmobile suspension mountable to the chassis of a snowmobile and about which an endless track is carried, the suspension comprising:
    a slide rail for engagement with a lower portion of the endless track;
    a downwardly angled rear suspension arm having an upper end pivotally connected to the snowmobile chassis and a lower end pivotally connected to the slide rail;
    a shock absorber coupled at one end to the snowmobile chassis and at another end to the slide rail;
    a coil spring secured around said shock absorber; and
    an overload spring away from the shock absorber and which forces the slide rail away from the chassis, wherein an overload spring force is transferred to the rear suspension arm at a location between the upper end and the lower end of said rear suspension arm, wherein the overload spring includes an overload arm which transfers the overload spring force to the rear suspension arm, wherein the overload arm is pivotally coupled to the slide rail, and
    wherein the overload spring force is transferred near an end of the rear suspension arm.

2. The snowmobile suspension of claim 1 wherein the overload arm is movable and engages the rear suspension arm at a common shaft.

3. The snowmobile suspension of claim 2 wherein the slide rail includes a plurality of apertures and the overload spring is retained at a particular position along the slide rail by engaging one of the plurality of apertures.

4. A snowmobile suspension mountable to the chassis of a snowmobile and about which an endless track is carried, the suspension comprising:
    a slide rail for engagement with a lower portion of the endless track;
    a downwardly angled rear suspension arm having an upper end pivotally connected to the snowmobile chassis and a lower end pivotally connected to the slide rail;
    a shock absorber coupled at one end to the snowmobile chassis and at another end to the slide rail;
    a coil spring secured around said shock absorber; and
    an overload spring away from the shock absorber and which forces the slide rail away from the chassis, wherein an overload spring force is transferred to the rear suspension arm at a location between the upper end and the lower end of said rear suspension arm, and
    control means for limiting an amount of mechanical coupling between the rear suspension arm and a front suspension arm.

5. The snowmobile suspension of claim 4 wherein in the control means includes a movable stop positioned to limit the rear suspension arm to a particular range of motion under a particular load condition.

6. The snowmobile suspension of claim 5 wherein the control means includes an adjuster for changing the position of the movable stop relative to the slide rail.

7. The snowmobile suspension of claim 6 wherein the adjuster includes a plurality of stops defined as a plurality of indexed stops.

8. A method of adjusting the performance characteristics of a snowmobile suspension system comprising:
    providing a snowmobile having a chassis and a suspension system mounted to the chassis and about which an endless track is carried, the suspension system comprising a downwardly angled rear suspension arm having an upper end pivotally connected to the snowmobile chassis and a lower end pivotally connected to the slide rail, a shock absorber and coil spring around the shock absorber, said shock absorber being connected between the snowmobile chassis and the slide rail, and an overload spring assembly including an overload spring engaging an overload arm, with said overload arm being rotatably connected to a overload arm support connected between sides of the slide rail away from said shock absorber, with said overload spring assembly providing a overload spring force tending to bias the slide rail away from the chassis, wherein the overload spring force is transferred to the rear suspension arm at a location between the upper end and the lower end; and
    adjusting the location of the overload spring assembly from a first location along the slide rail to a second location along the slide rail by moving the arm support from a first location to a second location along the slide rail, wherein a set of performance characteristics changes as the location of the overload spring assembly moves between the first location and the second location,
    wherein the step of adjusting is achieved by selectively moving the overload arm support of the overload spring assembly along the slide rail.

9. The method of claim 8 further comprising:
    providing a plurality of apertures spaced along the slide rail and wherein the overload arm support is selectively coupled to the slide rail via a fastener engaging one of the plurality of apertures.

10. The method of claim 8 wherein the overload spring assembly transfers the overload spring force to an axle connected to one end of the rear suspension arm.

11. A snowmobile suspension mountable to the chassis of a snowmobile and about which an endless track is carried, the suspension comprising:
    a slide rail for engagement with a lower portion of the endless track;
    a downwardly angled rear suspension arm having an upper end pivotally connected to the snowmobile chassis and a lower end pivotally connected to the slide rail;

a shock absorber coupled at one end to the snowmobile chassis and at another end to the slide rail;

a coil spring secured around the shock absorber;

an overload spring away from the shock absorber which forces the slide rail away from the chassis, wherein an overload spring force is transferred to the rear suspension arm at a location between the upper end and the lower end; and a movable stop which engages the rear suspension arm during a certain load condition wherein upon engagement of the movable stop with the rear suspension arm, the rear suspension arm is mechanically coupled to a front suspension arm.

12. The snowmobile suspension of claim 11 further comprising a overload arm connected to the slide rail with the overload spring applying a spring force through the overload arm to the rear suspension arm tending to force the slide rail away from the chassis.

13. The snowmobile suspension of claim 11 further comprising an adjuster which maintains the movable stop in one of a plurality of positions relative to the slide rail, said adjuster capable of being repositioned to change a relationship between the rear suspension arm and a front suspension arm.

14. A snowmobile suspension mountable to the chassis of a snowmobile and about which an endless track is carried, the suspension comprising:

a slide rail for engagement with a lower portion of the endless tract;

a downwardly angled rear suspension arm connected between an upper axle and the slide rail;

a shock absorber coupled at one end to the snowmobile chassis and at another end to the slide rail;

a coil spring secured around said shock absorber;

an adjuster for maintaining a stop in one of a plurality of positions relative to the chassis so as to control a relationship between the rear suspension arm and a front suspension arm during certain load conditions; and an overload spring away from the shock absorber and which forces the slide rail away from the chassis, wherein an overload spring force is transferred to the rear suspension arm at a location between the upper end and the lower end.

15. The snowmobile suspension of claim 14 wherein the adjustor includes a plate having an aperture and a plurality of stops positioned at different distances away from the aperture, said plate capable of being temporarily secured to the slide rail to temporarily fix the relationship between stop and the slide rail.

16. A snowmobile suspension mountable to the chassis of a snowmobile and about which an endless track is carried, the suspension comprising:

a slide rail for engagement with a lower portion of the endless track;

a downwardly angled rear suspension arm having an upper end pivotally connected to the snowmobile chassis and a lower end pivotally connected to the slide rail;

a shock absorber coupled at one end to the snowmobile chassis and at another end to the slide rail;

a coil spring secured around said shock absorber; and an overload spring away from the shock absorber and which forces the slide rail away from the chassis, wherein an overload spring force is transferred to the rear suspension arm at a location between the upper end and the lower end of said rear suspension arm, wherein the overload spring includes a second shock absorber coupled to the slide rail and extending generally parallel with side edges of the slide rail.

17. The snowmobile suspension of claim 14 wherein the overload spring includes a second shock absorber coupled to the slide rail and extending generally parallel with side edges of the slide rail.

* * * * *